(12) United States Patent
Lancashire et al.

(10) Patent No.: US 10,574,464 B2
(45) Date of Patent: Feb. 25, 2020

(54) METHOD AND SYSTEM FOR SECURING A BLOCKCHAIN WITH PROOF-OF-TRANSACTIONS

(71) Applicant: Proclus Technologies Limited, Hong Kong (CN)

(72) Inventors: David Begor Lancashire, Toronto (CA); Richard Michael Parris, Parkville (AU)

(73) Assignee: Proclus Technologies Limited, Hong Kong (CN)

( * ) Notice: Subject to any disclaimer, the term of this patent is extended or adjusted under 35 U.S.C. 154(b) by 0 days.

(21) Appl. No.: 16/249,514

(22) Filed: Jan. 16, 2019

(65) Prior Publication Data

US 2019/0149336 A1    May 16, 2019

Related U.S. Application Data

(63) Continuation of application No. 16/052,912, filed on Aug. 2, 2018, now Pat. No. 10,230,530.
(Continued)

(51) Int. Cl.
*H04L 9/32*     (2006.01)
*G06Q 20/40*    (2012.01)
(Continued)

(52) U.S. Cl.
CPC ........... *H04L 9/3236* (2013.01); *G06Q 20/06* (2013.01); *G06Q 20/3823* (2013.01);
(Continued)

(58) Field of Classification Search
CPC ............... G06Q 20/06; G06Q 20/3823; G06Q 20/3825; G06Q 20/3829; G06Q 2220/00;
(Continued)

(56) References Cited

U.S. PATENT DOCUMENTS 9,892,460 B1   2/2018   Winklevoss et al.
10,230,530 B2  3/2019   Lancashire et al.
(Continued)

FOREIGN PATENT DOCUMENTS

CN    105959307 A    9/2016
CN    106296184 A    1/2017
(Continued)

OTHER PUBLICATIONS

Babaioff (Dec. 2011) ACM SIGecom Exchanges, "On Bitcoin and Red Balloons," 10:3, pp. 5-9.
(Continued)

*Primary Examiner* — Theodore C Parsons
(74) *Attorney, Agent, or Firm* — Adsero IP

(57) ABSTRACT

Novel tools and techniques are provided for implementing blockchain transactions, and, more particularly, to methods, systems, and apparatuses for securing a blockchain with proof-of-transactions. In various embodiments, the blockchain system utilizes a proof-of-transactions approach that is based on a multi-player voting system and that is not susceptible to a free-rider problem that affects many other cryptocurrencies. The proof-of-transactions approach allows the cryptocurrency network to divide revenue between the nodes in the peer-to-peer network that provides bandwidth and connectivity and a set of other nodes that solve computational puzzles that safeguard the security of the blockchain system.

20 Claims, 15 Drawing Sheets

Related U.S. Application Data

(60) Provisional application No. 62/541,657, filed on Aug. 5, 2017.

(51) Int. Cl.
 *G06Q 20/06* (2012.01)
 *G06Q 20/38* (2012.01)

(52) U.S. Cl.
 CPC ..... *G06Q 20/3825* (2013.01); *G06Q 20/3829* (2013.01); *G06Q 20/401* (2013.01); *H04L 9/3247* (2013.01); *G06Q 2220/00* (2013.01); *H04L 2209/38* (2013.01); *H04L 2209/56* (2013.01)

(58) Field of Classification Search
 CPC ............. H04L 2209/38; H04L 2209/56; H04L 9/3247
 See application file for complete search history.

(56) References Cited

U.S. PATENT DOCUMENTS

| | | |
|---|---|---|
| 2007/0280865 A1 | 12/2007 | Tonev et al. |
| 2008/0264372 A1 | 10/2008 | Sisk et al. |
| 2016/0012424 A1 | 1/2016 | Simon et al. |
| 2016/0012465 A1 | 1/2016 | Sharp |
| 2016/0028552 A1 | 1/2016 | Spanos et al. |
| 2016/0080477 A1 | 3/2016 | Nedeltchev et al. |
| 2016/0267605 A1 | 9/2016 | Lingham et al. |
| 2016/0283920 A1 | 9/2016 | Fisher et al. |
| 2016/0292672 A1 | 10/2016 | Fay et al. |
| 2016/0358161 A1 | 12/2016 | Cobban et al. |
| 2017/0109955 A1 | 4/2017 | Ernest et al. |
| 2018/0039667 A1 | 2/2018 | Pierce et al. |
| 2018/0109541 A1 | 4/2018 | Gleichauf |
| 2019/0043024 A1 | 2/2019 | Lancashire |
| 2019/0044725 A1 | 2/2019 | Lancashire |
| 2019/0044734 A1 | 2/2019 | Lancashire et al. |
| 2019/0080392 A1 | 3/2019 | Youb et al. |
| 2019/0182048 A1 | 6/2019 | Lancashire |
| 2019/0296915 A1 | 9/2019 | Lancashire |

FOREIGN PATENT DOCUMENTS

| | | |
|---|---|---|
| CN | 106503589 A | 3/2017 |
| CN | 106843774 A | 6/2017 |
| CN | 106952124 A | 7/2017 |
| CN | 107005574 A | 8/2017 |
| WO | WO-2017-079652 A1 | 5/2017 |
| WO | WO-2019-029429 A1 | 2/2019 |
| WO | WO-2019-029430 A1 | 2/2019 |
| WO | WO-2019-029431 A1 | 2/2019 |

OTHER PUBLICATIONS

U.S. Appl. No. 16/052,912, filed Aug. 2, 2018; 95 pages.
U.S. Appl. No. 16/052,974, filed Aug. 2, 2018; 95 pages.
International Search Report and Written Opinion prepared by the State Intellectual Property Office of the P.R. China, as International Searching Authority for PCT International Patent Application No. PCT/CN2018/098317, dated Sep. 30, 2018, 8 pages.
U.S. Appl. No. 16/052,912 Notice of Allowance dated Oct. 29, 2018; 24 pages.
International Search Report and Written Opinion prepared by the State Intellectual Property Office of the P.R. China, as International Searching Authority for PCT International Patent Application No. PCT/CN2018/098316, dated Oct. 31, 2018, 10 pages.
International Search Report and Written Opinion prepared by the State Intellectual Property Office of the P.R. China, as International Searching Authority for PCT International Patent Application No. PCT/CN2018/098318, dated Nov. 6, 2018, 9 pages.
U.S. Appl. No. 16/279,631, filed Feb. 19, 2019; 77 pages.
U.S. Appl. No. 16/052,944, Final Office Action dated Jun. 17, 2019, 22 pages.
U.S. Appl. No. 16/052,974, Office Action Restriction-Requirement dated Jul. 25, 2019, 7 pages.
U.S. Appl. No. 16/052,974, Non-Final Office Action, dated Oct. 16, 2019, 38 pages.
U.S. Appl. No. 16/409,449, Notice of Allowance dated Nov. 6, 2019, 26 pages.

CONVENTIONAL ART

METHOD AND SYSTEM FOR SECURING A BLOCKCHAIN WITH PROOF-OF-TRANSACTIONS

CROSS-REFERENCES TO RELATED APPLICATIONS

This application is a continuation application of U.S. patent application Ser. No. 16/052,912 (the "'912 Applications"), filed Aug. 2, 2018 by David Begor Lancashire, entitled, "Method and System for Securing a Blockchain with Proof-of-Transactions," which claims priority to U.S. patent application Ser. No. 62/541,657 (the "'657 Applications"), filed Aug. 5, 2017 by David Begor Lancashire, entitled, "Method to Secure a Blockchain with Proof-of-Transactions," the disclosure of which are incorporated herein by reference in their entirety for all purposes.

This application may be related to U.S. patent application Ser. No. 16/052,944 (the "'944 Applications" filed Aug. 2, 2018 by David Begor Lancashire, entitled, "Method and System for Securing a Blockchain with Proof-of-Transactions" and U.S. patent application Ser. No. 16/052,974 (the "'974 Applications") filed Aug. 2, 2018 by David Begor Lancashire, entitled, "Method and System for Securing a Blockchain with Proof-of-Transactions," each of which also claims priority to the '657 Applications.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing blockchain transactions, and, more particularly, to methods, systems, and apparatuses for securing a blockchain with proof-of-transactions.

BACKGROUND

After the release of the Bitcoin software in 2011, many of the early applications that adopted the network (i.e., SatoshiDice) used bitcoin less as a pure payments service, and more as an open-access messaging layer that could persist in the absence of centralised management through the distribution of transaction fees to participants in the network. These early applications would often send and receive payments with their users, but many would also use the blockchain to broadcast non-payment information across the network, typically injecting such information into transactions in surreptitious ways, one such way being the encoding of human-readable information into false addresses to which minuscule and unspendable amounts of bitcoin were sent (which may be referred to as "dust transactions").

The desire of many developers to use the Bitcoin network as an open-access and uncensorable messaging platform eventually drove them into conflict with other developers who were focused on making Bitcoin a more mainstream digital currency, with the conflict between the two camps arising over the fact that the Bitcoin blockchain compiles every transaction ever sent into a permanent ledger that needs to be stored in perpetuity by many of the nodes in the network. Since applications that added non-payment information to transactions forced this data to be added to the Bitcoin blockchain, and since this blockchain needs to be stored by most nodes in the system in perpetuity, messaging applications increased the costs of running nodes in the network much more than did payment-focused applications.

In short time, it became clear that the growth of the blockchain was posing an economic problem that threatened to undermine the network. As the size of the blockchain grew, developers feared that the rising bandwidth and storage requirements for running a full copy of the Bitcoin software would result in many nodes in the peer-to-peer network eventually shutting down, something that would hurt the decentralization of the Bitcoin network. The problem in essence came about because of Bitcoin's proof-of-work security system, which directed all of the revenue generated by the system to a special class of nodes called "miners" who secured the network from attack but did not need to contribute significant amounts of bandwidth or connectivity to the peer-to-peer network to do so. In economics, this is known as a "free-rider" problem as the "miners" were able to "free-ride" on a peer-to-peer network provided by other actors: they could source transactions from the network and use it to generate income, but did not need to contribute commensurate revenue to support the peer-to-peer network themselves, and in fact would work to undermine it by funding private, competing channels for transaction and block distribution such as the Bitcoin FIBRE network.

As a result, to help keep the costs of running nodes in the peer-to-peer network reasonably low and thus preserve the decentralization of the network, many core Bitcoin developers began a rearguard campaign against the inclusion of non-payment information in Bitcoin transactions, with prominent developers first labelling applications that persisted in writing such information to the blockchain as "spam" and then embracing a strategy to cripple Bitcoin's on-chain transaction capacity in order to drive up the fees that transactions would need to pay for inclusion and thus drive these "messaging" transactions off the network through price pressure. In some cases, this conflict even led to vocal disagreements in the Bitcoin community over such reasonably trivial things as the question of whether transactions should support a 40 or 80-byte user-editable OP_RETURN field.

As alternatives to Bitcoin have emerged in recent years, this problem has gone unaddressed. While there have been efforts to replace Bitcoin's proof-of-work system, none has been developed which satisfactorily solves this "free rider" problem. One of the more well-known alternatives to proof-of-work is being developed by the Ethereum™ Network, for instance, which calls its new approach a proof-of-stake system. While this new security method avoids the need for computers to burn electricity to secure the network, its security function does not solve the "free rider" problem described above: the economic issue of full node under-provision that happens because miners/stakers (the nodes that provide security against various forms of attack on the network) are paid out of transaction fees while nodes in the peer-to-peer network (which provide bandwidth and open access) are expected to operate on a volunteer basis.

In technical terms, current blockchain functionality is not scalable in terms of maintaining security and decentralization, including maintaining the associated bandwidth and connectivity that the decentralization provides.

Hence, there is a need for more robust and scalable solutions for implementing blockchain transactions.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
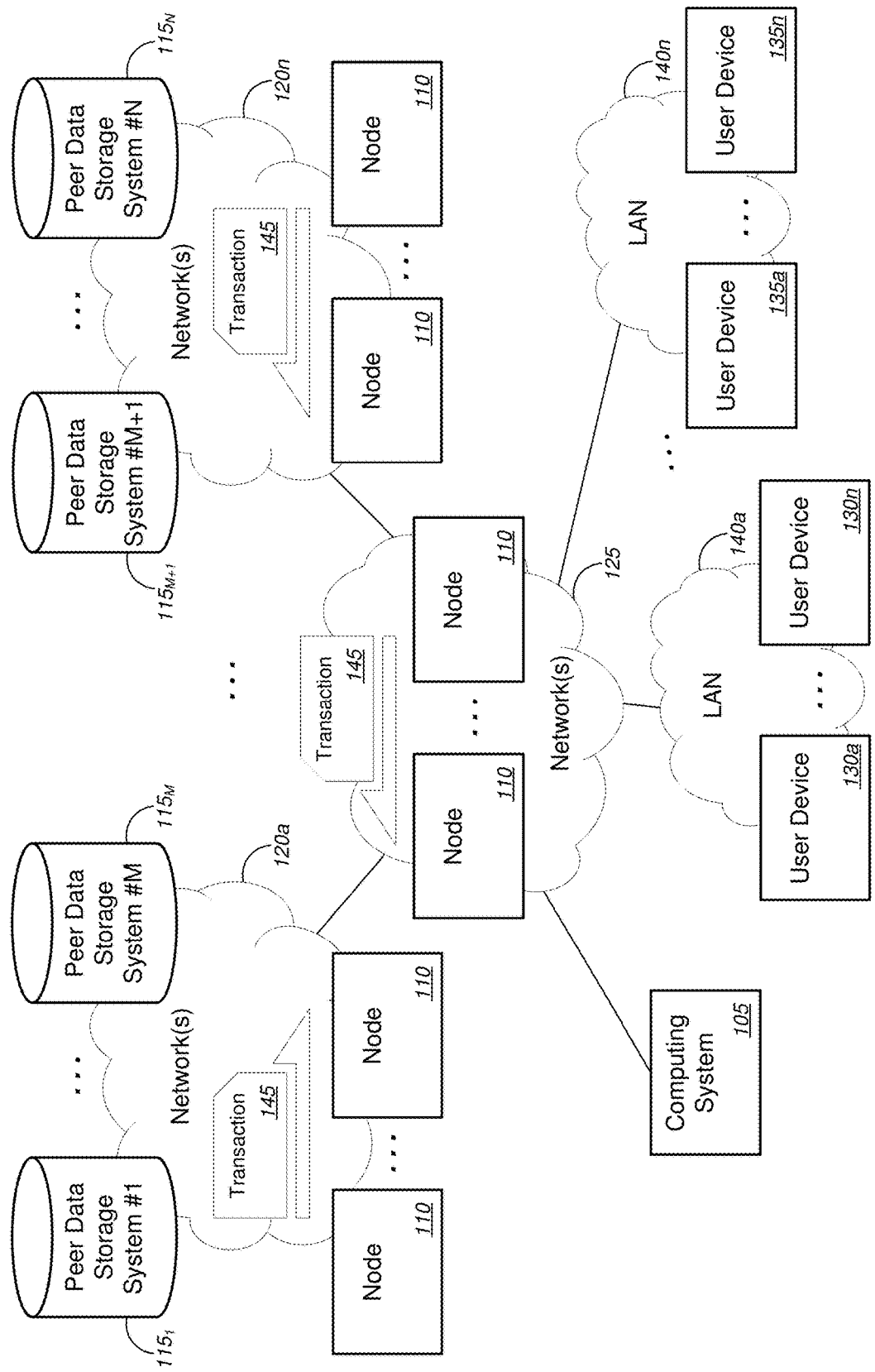
FIG. 1 is a schematic diagram illustrating a blockchain system that may be secured using proof of transactions, in accordance with various embodiments.

Various embodiments provide tools and techniques for implementing blockchain transactions, and, more particularly, to methods, systems, and apparatuses for securing a blockchain with proof-of-transactions.

The various embodiments provide a method to secure a cryptocurrency that avoids a "free-rider" economic problem that affects many cryptocurrencies and hurts their ability to scale. The embodiments described herein solve this problem by utilizing a new security method (namely, "proof-of-transactions") based on a multi-player voting system that is not susceptible to this free-rider problem and allows a cryptocurrency network to divide its revenue between the set of nodes in the peer-to-peer network that provides bandwidth and connectivity and a separate set of nodes, the role of which is to safeguard the security of the system. By enabling a cryptocurrency network to reward nodes that contribute bandwidth and connectivity to the network in addition to those that ensure the security of block issuance, the various embodiments allow cryptocurrencies to increase the amount of data processed by the network in an economically-efficient manner. This permits the development of fundamentally new applications, including, but not limited to, secure but decentralized email services, peer-to-peer social networks, pay-to-play websites, secure data-routing networks, SSH-key registries that are safe from man-in-the-middle ("MITM") attacks, and/or the like.

Given the importance of blockchain technology and the need for more effective ways to scale up these networks to handle massive amounts of data, the importance of the various embodiments lies in the way they offer a simple and elegant solution to the free-rider problem, by outlining an unintuitive method for securing a blockchain (i.e., a proof-of-transactions approach) that enables network fees to be used to compensate both the nodes that provide security in the system as well as the nodes that form the backbone of the peer-to-peer network. While the voting method described here can be generalized to divide payments between any number of classes of actors in a blockchain network, simply by extending the voting process so that all actors are required to vote to approve changes to network consensus, in the description below we focus on a system with only two types of nodes (namely, "nodes" and "miners") as these best describe the current needs of blockchain systems. And our method has many unexpected virtues: allocating fees between these classes of nodes in a transparent way that responds in real-time to the market-driven demands of the applications on the network for more bandwidth or security respectively.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, blockchain technology, and/or the like. In other aspects, certain embodiments, can improve the functioning of user equipment or systems themselves (e.g., blockchain network nodes, blockchain network infrastructure, etc.), for example, by utilizing a proof-of-transactions approach to address the "free-rider" issue that may exist in conventional blockchain systems, and/or the like.

In particular, to the extent any abstract concepts are present in the various embodiments, those concepts can be implemented as described herein by devices, software, systems, and methods that involve specific novel functionality (e.g., steps or operations), such as, embedding, by a first node among a plurality of nodes in a peer-to-peer blockchain network and into an unconfirmed transaction being propagated across said network for eventual inclusion in a block, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network; validating, with a second node among the plurality of nodes, the chain of signatures embedded in the transactions included in a block of a blockchain to confirm that the block itself is valid in accordance with a set of consensus rules of the blockchain; quantifying, by one or more third nodes among the plurality of nodes in the blockchain network and in accordance with a set of consensus rules of a blockchain, a level of difficulty associated with producing a valid candidate block by reducing it to a burn fee, wherein the burn fee is a cost denominated in a value of a token managed by the blockchain network; quantifying, by the one or more third nodes and in accordance with the set of consensus rules of the blockchain, the value of one or more transactions being included in a candidate block by reducing it to a burn value, wherein the burn value is a figure denominated in a value of a token managed by the blockchain network; determining, with the one or more third nodes and in accordance with the set of consensus rules of the blockchain, whether a sum of individual burn values of the one or more transactions that are included in the candidate block is equal to or greater than the burn fee of the candidate block; based on a determination that the sum of individual burn values of the one or more transactions that are included in the candidate block is equal to or greater than the burn fee of the candidate block, determining, with the one or more third nodes, that the candidate block is valid according to the set of consensus rules of the blockchain; generating, by a fourth node among the plurality of nodes in the blockchain network, a golden ticket that contains a computational puzzle; generating, by a fifth node among the plurality of nodes in the blockchain network, a solution to the computational puzzle in the golden ticket, wherein the solution to the computational puzzle is used to select, in a manner that cannot be anticipated by the fourth node generating the golden ticket, one or more network nodes among the plurality of nodes in the blockchain network; and distributing blockchain tokens to the one or more network nodes that are selected using the solution to the computational puzzle in the golden ticket, wherein tokens allocated through use of golden tickets are split between one or more network nodes that have provided solutions to golden tickets ("lucky miners") and one or more nodes selected by one or more solutions to the golden tickets ("lucky nodes"), wherein distribution of the tokens split between lucky miners and lucky nodes is determined by a paysplit variable managed according to consensus rules of the blockchain, wherein a difficulty level of the computational puzzle is determined using a difficulty variable managed according to consensus rules of the blockchain, and/or the like, to name a few examples, that extend beyond mere conventional computer processing operations. These functionalities can produce tangible results outside of the implementing computer system, including, merely by way of example, optimized functionality of blockchain networks regardless of the number of transactions or blocks in any particular blockchain, and over decades of operation, and/or the like, at least some of which may be observed or measured by users and/or service providers (including miners, nodes, and/or the like).

In an aspect, a method might comprise embedding, by a first node among a plurality of nodes in a peer-to-peer blockchain network and into an unconfirmed transaction being propagated across said network for eventual inclusion in a block, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network. The method might further comprise validating, with a second node among the plurality of nodes, the chain of signatures embedded in the transactions included in a block of a blockchain to confirm that the block itself is valid in accordance with a set of consensus rules of the blockchain.

In some embodiments, each node among the plurality of nodes in the peer-to-peer blockchain network might be associated with a unique public/private key pair and a network address. In some cases, the unique public/private key pair might comprise a public key and a private key. In some instances, the network address of a node among the plurality of nodes might contain information derived from the unique public/private key pair of the node, and a cryptographic signature of the node might be generated by using the private key of the unique public/private key pair of the node to sign a network address of a subsequent node among the plurality of nodes to which the transaction is routed by the node.

According to some embodiments, the network address and the other network addresses might constitute a plurality of network addresses. In some cases, a network address associated with an originating node that originates the transaction might not be included in (or might be excluded from) the plurality of network addresses, based on a determination that information required to validate a cryptographic signature associated with the originating node is already included in the transaction. In some instances, the first node and the second node might be the same node. Alternatively, the first node and the second node might be different nodes.

In some embodiments, the method might further comprise quantifying, by one or more third nodes among the plurality of nodes in the blockchain network and in accordance with a set of consensus rules of a blockchain, a level of difficulty associated with producing a valid candidate block by reducing it to a burn fee, wherein the burn fee is a cost denominated in a value of a token managed by the blockchain network; quantifying, by the one or more third nodes and in accordance with the set of consensus rules of the blockchain, the value of one or more transactions being included in a candidate block by reducing it to a burn value, wherein the burn value is a figure denominated in a value of a token managed by the blockchain network; determining, with the one or more third nodes and in accordance with the set of consensus rules of the blockchain, whether a sum of individual burn values of the one or more transactions that are included in the candidate block is equal to or greater than the burn fee of the candidate block; and based on a determination that the sum of individual burn values of the one or more transactions that are included in the candidate block is equal to or greater than the burn fee of the candidate block, determining, with the one or more third nodes, that the candidate block is valid according to the set of consensus rules of the blockchain.

According to some embodiments, the burn fee might be algorithmically set by at least one computing system in the blockchain network. Alternatively, or additionally, a burn fee needed for production of a block might decrease over time in proportion to time elapsed since generation of a preceding block in the blockchain. In some cases, a burn value of a transaction might comprise a transaction fee paid by an originator of the transaction for inclusion of its transaction in the blockchain. In some instances, a burn value of a transaction might be adjusted depending on whether the transaction contains a valid chain of embedded cryptographic signatures establishing a route that the transaction has taken in its course of propagating across the blockchain network. In some cases, a burn value of a transaction might be adjusted downward depending on the number of hops that the transaction has made across the blockchain network, as measured by an embedded chain of cryptographic signatures contained within the transaction that document its course of transmission across the blockchain network. In some instances, the burn value of the transaction might be halved with each additional hop beyond a first hop that the transaction has made through the blockchain network from its point of origin to its point of inclusion in a block.

In some embodiments, the method might further comprise determining, with at least a majority of the plurality of nodes in the blockchain network, whether aggregate burn values of the transactions included in a block are sufficient to pay for the burn fee required for production of a block; and based on a determination that the aggregate burn values of the transactions included in the block are sufficient to pay for the burn fee required for the production of the block, determining, with the at least a majority of the plurality of nodes in the blockchain network, that the block is valid and including, with the at least a majority of the plurality of nodes in the blockchain network, the block in a blockchain. In some instances, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some cases, at least a portion of the burn value of the one or more transactions included in the candidate block might be removed from circulation and not transferred to a node that produced the candidate block.

According to some embodiments, the method might further comprise pruning, by one or more fourth nodes among the plurality of nodes within the blockchain network, transaction slips in blocks in a blockchain preceding an arbitrary block identified according to consensus rules of the blockchain; calculating, by the one or more fourth nodes among the plurality of nodes within the blockchain network, a value of all unspent tokens contained in all unpruned blocks preceding and including the last block being pruned; and adjusting a monetary policy of the blockchain network so that the blockchain network will reintroduce the unspent tokens as tokens allocated in future blocks. In some cases, the unspent tokens might be reintroduced back into the blockchain network in a later block through use of golden tickets.

In another aspect, a system might comprise a first node among a plurality of nodes in a peer-to-peer blockchain network and a second node among the plurality of nodes. The first node might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first node to: embed, into an unconfirmed transaction being propagated across said network for eventual inclusion in a block, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network.

The second node might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second node to: validate the chain of signatures embedded in the transactions included in a block of a blockchain to confirm that the block itself is valid in accordance with a set of consensus rules of the blockchain. In some instances, the first node and the second node might be the same node. Alternatively, the first node and the second node might be different nodes.

In yet another aspect, a method might comprise embedding, by a first node among a plurality of nodes in a peer-to-peer blockchain network and into an unconfirmed transaction being propagated across said network for eventual inclusion in a block, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network; validating, with a second node among the plurality of nodes, the chain of signatures embedded in the transactions included in a block of a blockchain to confirm that the block itself is valid in accordance with a set of consensus rules of the blockchain; quantifying, by one or more third nodes among the plurality of nodes in the blockchain network and in accordance with a set of consensus rules of a blockchain, a level of difficulty associated with producing a valid candidate block by reducing it to a burn fee, wherein the burn fee is a cost denominated in a value of a token managed by the blockchain network; quantifying, by the one or more third nodes and in accordance with the set of consensus rules of the blockchain, the value of one or more transactions being included in a candidate block by reducing it to a burn value, wherein the burn value is a figure denominated in a value of a token managed by the blockchain network; determining, with the one or more third nodes and in accordance with the set of consensus rules of the blockchain, whether a sum of individual burn values of the one or more transactions that are included in the candidate block is equal to or greater than the burn fee of the candidate block; based on a determination that the sum of individual burn values of the one or more transactions that are included in the candidate block is equal to or greater than the burn fee of the candidate block, determining, with the one or more third nodes, that the candidate block is valid according to the set of consensus rules of the blockchain; generating, by a fourth node among the plurality of nodes in the blockchain network, a golden ticket that contains a computational puzzle; generating, by a fifth node among the plurality of nodes in the blockchain network, a solution to the computational puzzle in the golden ticket, wherein the solution to the computational puzzle is used to select, in a manner that cannot be anticipated by the fourth node generating the golden ticket, one or more network nodes among the plurality of nodes in the blockchain network; broadcasting, by the fifth node, the solution to the golden ticket throughout the blockchain network, the solution being included in a subsequent block that is produced and validated by the blockchain network; and distributing blockchain tokens to the one or more network nodes that are selected using the solution to the computational puzzle in the golden ticket, wherein tokens allocated through use of golden tickets are split between one or more network nodes that have provided solutions to golden tickets ("lucky miners") and one or more nodes selected by one or more solutions to the golden tickets ("lucky nodes"), wherein distribution of the tokens split between lucky miners and lucky nodes is determined by a paysplit variable managed according to consensus rules of the blockchain, wherein a difficulty level of the computational puzzle is determined using a difficulty variable managed according to consensus rules of the blockchain.

In an aspect, a method might comprise quantifying, by one or more first nodes among a plurality of nodes in a blockchain network and in accordance with a set of consensus rules of a blockchain, a level of difficulty associated with producing a valid candidate block by reducing it to a burn fee, wherein the burn fee is a cost denominated in a value of a token managed by the blockchain network; quantifying, by the one or more first nodes and in accordance with the set of consensus rules of the blockchain, the value of one or more transactions being included in a candidate block by reducing it to a burn value, wherein the burn value is a figure denominated in a value of a token managed by the blockchain network; determining, with the one or more first nodes and in accordance with the set of consensus rules of the blockchain, whether a sum of individual burn values of the one or more transactions that are included in the candidate block is equal to or greater than the burn fee of the candidate block; and based on a determination that the sum of individual burn values of the one or more transactions that are included in the candidate block is equal to or greater than the burn fee of the candidate block, determining, with the one or more first nodes, that the candidate block is valid according to the set of consensus rules of the blockchain.

According to some embodiments, the burn fee might be algorithmically set by at least one computing system in the blockchain network. Alternatively, or additionally, a burn fee needed for production of a block might decrease over time in proportion to time elapsed since generation of a preceding block in the blockchain. In some cases, a burn value of a transaction might comprise a transaction fee paid by an originator of the transaction for inclusion of its transaction in the blockchain. In some instances, a burn value of a transaction might be adjusted depending on whether the transaction contains a valid chain of embedded cryptographic signatures establishing a route that the transaction has taken in its course of propagating across the blockchain network. In some cases, a burn value of a transaction might be adjusted downward depending on the number of hops that the transaction has made across the blockchain network, as measured by an embedded chain of cryptographic signatures contained within the transaction that document its course of transmission across the blockchain network. In some instances, the burn value of the transaction might be halved with each additional hop beyond a first hop that the transaction has made through the blockchain network from its point of origin to its point of inclusion in a block.

In some embodiments, the method might further comprise determining, with at least a majority of the plurality of nodes in the blockchain network, whether aggregate burn values of the transactions included in a block are sufficient to pay for the burn fee required for production of a block; and based on a determination that the aggregate burn values of the transactions included in the block are sufficient to pay for the burn fee required for the production of the block, determining, with the at least a majority of the plurality of nodes in the blockchain network, that the block is valid and including, with the at least a majority of the plurality of nodes in the blockchain network, the block in a blockchain. In some instances, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some cases, at least a portion of the burn value of the one or more transactions included in the candidate block might be removed from circulation and not transferred to a node that produced the candidate block.

In another aspect, a node among a plurality of nodes in a blockchain network might be provided, the node comprising: at least one processor; and a non-transitory computer readable medium communicatively coupled to the at least one processor. The non-transitory computer readable medium might have stored thereon computer software comprising a set of instructions that, when executed by the at least one processor, causes the node to: quantify, in accordance with a set of consensus rules of a blockchain, a level of difficulty associated with producing a valid candidate block by reducing it to a burn fee, wherein the burn fee is a cost denominated in a value of a token managed by the blockchain network; quantify, in accordance with the set of consensus rules of the blockchain, the value of one or more transactions being included in a candidate block by reducing it to a burn value, wherein the burn value is a figure denominated in a value of a token managed by the blockchain network; determine, in accordance with the set of consensus rules of the blockchain, whether a sum of individual burn values of the one or more transactions that are included in the candidate block is equal to or greater than the burn fee of the candidate block; and based on a determination that the sum of individual burn values of the one or more transactions that are included in the candidate block is equal to or greater than the burn fee of the candidate block, determine that the candidate block is valid according to the set of consensus rules of the blockchain.

According to some embodiments, the burn fee might be algorithmically set by at least one computing system in the blockchain network. Alternatively, or additionally, a burn fee needed for production of a block might decrease over time in proportion to time elapsed since generation of a preceding block in the blockchain. In some cases, a burn value of a transaction might comprise a transaction fee paid by an originator of the transaction for inclusion of its transaction in the blockchain. In some instances, a burn value of a transaction might be adjusted depending on whether the transaction contains a valid chain of embedded cryptographic signatures establishing a route that the transaction has taken in its course of propagating across the blockchain network. In some cases, a burn value of a transaction might be adjusted downward depending on the number of hops that the transaction has made across the blockchain network, as measured by an embedded chain of cryptographic signatures contained within the transaction that document its course of transmission across the blockchain network. In some instances, the burn value of the transaction might be halved with each additional hop beyond a first hop that the transaction has made through the blockchain network from its point of origin to its point of inclusion in a block.

In some instances, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some cases, at least a portion of the burn value of the one or more transactions included in the candidate block might be removed from circulation and not transferred to a node that produced the candidate block.

In yet another aspect, a method might comprise pruning, by one or more first nodes among the plurality of nodes within the blockchain network, transaction slips in blocks in a blockchain preceding an arbitrary block identified according to consensus rules of the blockchain; calculating, by the one or more first nodes among the plurality of nodes within the blockchain network, a value of all unspent tokens contained in all unpruned blocks preceding and including the last block being pruned; and adjusting a monetary policy of the blockchain network so that the blockchain network will reintroduce the unspent tokens as tokens allocated in future blocks. In some cases, the unspent tokens might be reintroduced back into the blockchain network in a later block through use of golden tickets.

In still another aspect, a node among a plurality of nodes in a blockchain network might be provided, the node comprising: at least one processor; and a non-transitory computer readable medium communicatively coupled to the at least one processor. The non-transitory computer readable medium might have stored thereon computer software comprising a set of instructions that, when executed by the at least one processor, causes the node to: prune transaction slips in blocks in a blockchain preceding an arbitrary block identified according to consensus rules of the blockchain; calculate a value of all unspent tokens contained in all unpruned blocks preceding and including the last block being pruned; and adjust a monetary policy of the blockchain network so that the blockchain network will reintroduce the unspent tokens as tokens allocated in future blocks. According to some embodiments, the unspent tokens are reintroduced back into the blockchain network in a later block through use of golden tickets.

In an aspect, a method might comprise generating, by a first network node among a plurality of network nodes in a blockchain network, a golden ticket that contains a computational puzzle; generating, by a second network node among the plurality of network nodes in the blockchain network, a solution to the computational puzzle in the golden ticket, wherein the solution to the computational puzzle is used to select, in a manner that cannot be anticipated by the first network node generating the golden ticket, one or more network nodes among the plurality of network nodes in the blockchain network; and distributing blockchain tokens to the one or more network nodes that are selected using the solution to the computational puzzle in the golden ticket.

In some instances, the first node and the second node might be the same node. Alternatively, the first node and the second node might be different nodes. In some embodiments, the golden ticket might be at least one of included in a block published for inclusion in a blockchain or automatically associated with the block. In some cases, the golden ticket might comprise a random number that is created using data associated with the block. In some instances, the random number might comprise a cryptographic hash of data content contained within the block. In some cases, the solution to the golden ticket might be included in a block immediately following the block in which the golden ticket is included was published. In some instances, any valid blockchain might contain one or more golden tickets, each of which may be solved only once.

According to some embodiments, a block might contain only one solution to any particular golden ticket. In some cases, a block might contain only one golden ticket. In some instances, a block might contain a solution to only one golden ticket. In some cases, a block might be considered to be invalid based on a determination that the block contains a golden ticket solution that is invalid. In some instances, the solution to the computational puzzle in the golden ticket might comprise a product of a computationally difficult challenge that is independently verifiable by other nodes in the blockchain network. In some cases, the solution to the computational puzzle in the golden ticket that is generated by the second network node might be generated based on a hash of data associated with the golden ticket that meets validity criteria as defined in consensus rules of the blockchain.

In some embodiments, the solution to the computational puzzle in the golden ticket might be used to select one or more network nodes from a subset of network nodes among the plurality of network nodes in the blockchain network that are identified as being valuable routing nodes with regard to production of a block containing the golden ticket. In some instances, routing nodes might be determined to be valuable based at least in part on data from a list of active routing nodes recorded within chains of cryptographic signatures and addresses embedded within transactions that are contained in the block containing the golden ticket. In some cases, the list of active routing nodes might be restricted to network nodes that are recorded within chains of cryptographic signatures and addresses embedded within transactions that are included within the same block that contains a golden ticket. In some instances, a likelihood that the one or more network nodes are selected might be weighted according to a determination that the one or more network nodes are each perceived to contribute to health of the blockchain network as a whole, as measured based on consensus rules of the blockchain and using factors including at least one of a value of a transaction fee associated with each transaction or a burn value of a transaction.

According to some embodiments, an amount of tokens allocated through use of golden tickets might be equivalent to transaction fees paid in a block containing a golden ticket that contains a computational puzzle to which a solution has been generated. In some cases, an amount of tokens allocated through use of golden tickets might be equivalent to transaction fees paid in a block containing a golden ticket that contains a computational puzzle to which a solution has been generated, minus any value tokens allocated to a network node that generates the block containing the golden ticket, and adjusted to be plus or minus another amount determined by consensus rules of the blockchain to maintain a consistent money supply. In some instances, tokens allocated through use of golden tickets might be split between one or more network nodes that have provided solutions to golden tickets ("lucky miners") and one or more nodes selected by one or more solutions to the golden tickets ("lucky nodes"). In some cases, votes to adjust variables contained in one of a block, the golden ticket, or the solution might be used to adjust a value of consensus variables once the solution to the golden ticket is included in the block and tokens are allocated to the lucky node and lucky miner in the blockchain network. In some instances, distribution of the tokens split between lucky miners and lucky nodes might be determined by a paysplit variable managed according to consensus rules of the blockchain. In some cases, the paysplit variable might be adjusted to direct one of a greater proportion or a lesser proportion of the blockchain tokens being distributed to the one or more network nodes that are selected.

In some embodiments, the method might further comprise embedding, within one of a block or a golden ticket, a variable that indicates whether to increase, to hold constant, or to decrease a value of the paysplit variable managed according to the consensus rules of the blockchain. In some instances, blocks that contain a vote of the block indicating one of to decrease or to increase a value of the paysplit variable might include only transactions that are consistent with the vote of the block indicating the one of to decrease or to increase the value of the paysplit variable. In alternative embodiments, the method might further comprise embedding, within a transaction, a variable that indicates whether to increase, to hold constant, or to decrease a value of the paysplit variable managed according to the consensus rules of the blockchain.

According to some embodiments, a difficulty level of the computational puzzle might be determined using a difficulty variable managed according to consensus rules of the blockchain. In some cases, the difficulty variable might be adjusted to make selection of which network nodes to provide eligible solutions one of more difficult or less difficult, wherein a higher difficulty corresponds to a reduced set of nodes that will be considered eligible to generate solutions under the consensus rules of the blockchain. In some instances, the method might further comprise embedding, within a solution to a golden ticket, a variable that indicates whether to increase, to hold constant, or to decrease a value of the difficulty variable managed according to the consensus rules of the blockchain. In some cases, the computational puzzle might establish a two-player chain, wherein the two-player chain established by the computational puzzles might be extended into a chain with an arbitrary number of participants, to perform at least one of providing additional randomness or splitting allocation of tokens into a finer distribution settling to more participants in the blockchain network.

In some embodiments, the method might further comprise embedding, within one of a block or a golden ticket, a variable that indicates whether to decrease, to hold constant, or to increase a value of a network consensus variable ("vote of the block" or "vote of the golden ticket"). In some cases, blocks that contain a vote of the block indicating one of to decrease or to increase a value of the network consensus variable might include only transactions that are consistent with the vote of the block indicating the one of to decrease or to increase the value of the network consensus variable. In alternative embodiments, the method might further comprise embedding, within a solution to a golden ticket, a variable that indicates whether to decrease, to hold constant, or to increase a value of a network consensus variable ("vote of the golden ticket"). Alternatively, or additionally, the method might further comprise embedding, within a transaction, a variable that indicates whether to decrease, to hold constant, or to increase a value of a network consensus variable ("vote of the transaction").

In another aspect, a system might comprise a first network node among a plurality of network nodes in a blockchain network, a second network node among the plurality of network nodes, and a computing system. The first network node might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first network node to: generate a golden ticket that contains a computational puzzle.

The second network node might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second network node to: generate a solution to the computational puzzle in the golden ticket, wherein the solution to the computational puzzle is used to select, in a manner that cannot be anticipated by the first network node generating the golden ticket, one or more network nodes among the plurality of network nodes in the blockchain network.

The computing system might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the third network node to: distribute blockchain tokens to the one or more network nodes that are selected using the solution to the computational puzzle in the golden ticket.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-9 illustrate some of the features of the method, system, and apparatus for implementing blockchain transactions, and, more particularly, to methods, systems, and apparatuses for securing a blockchain with proof-of-transactions, as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a blockchain system 100 that may be secured using proof of transactions, in accordance with various embodiments.

In the non-limiting embodiment of FIG. 1, system 100 might comprise a computing system 105, which might include, without limitation, one of a processor on a user device, a network node, a high speed signing network card(s), a network interface device, a server computer, a cloud-based computing system, a distributed computing system, and/or the like. System 100 might further comprise a plurality of nodes 110 and a plurality of peer data storage systems 115$_1$-115$_X$ and 115$_Y$-115$_N$ (collectively, "peer data storage systems 115," "data storage 115," or the like), both distributed across a plurality of networks 120a-120n (collectively, "networks 120" or the like). As shown in FIG. 1, for example, distributed peer data storage systems #1 115$_1$ through #X 115$_X$ might be disposed in one or more networks 120a, while distributed peer data storage systems #Y 115$_Y$ through #N 115$_N$ might be disposed in one or more networks 120n. Although not shown, distributed peer data storage systems #X+1 115$_{X+1}$ through #Y−1 115$_{Y-1}$ (as well as other nodes 110) might be disposed in one or more networks 120b through 120n-1. In some cases, each distributed peer storage system 115 might comprise a database, and in some cases, a local server or local computing system that accesses the database in response to requests from external or remote computing systems (e.g., computing system 105, nodes 110, user devices, or the like). In some embodiments, computing system 105 might communicatively couple with one or more of the distributed peer data storage systems 115 in networks 120 via one or more networks 125. In some cases, at least some of the plurality of nodes 110 might also be disposed in the one or more networks 125. System 100 might further comprise one or more user devices 130a-130n and 135a-135n (collectively, "user devices," "user devices 130," or "user devices 135," or the like) disposed in one or more local area networks ("LANs") 140a-140n (collectively, "LANs 140" or the like). The user devices might be associated with users who might initiate or participate in transactions 145, which when validated or confirmed might be incorporated in one or more blocks in a blockchain. In some embodiments (as described below), a user associated with one of the user devices might participate in a three-party activity with a miner (which solves computational puzzles in the golden ticket) and a node (which provides bandwidth and connectivity for the transactions), by being provided with the capability to tag their transactions with an optional paysplit vote (which the system 100 or the network might require might only be included if the votes are aligned in the same direction rather than conflicting).

According to some embodiments, networks 120a-120n and 125 might each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider and/or the Internet.

In operation, the plurality of nodes 110 might propagate an unconfirmed transaction 145 (among a plurality of transactions 145) across at least one of the one or more networks 120a-120n and/or the network(s) 125 (collectively, "peer-to-peer blockchain network," "blockchain network," or "network," or the like). The computing system 105 or a first node 110 among the plurality of nodes 110 might embed, into the unconfirmed transaction 145, a cryptographic signature and a network address that combines with other cryptographic signatures and network addresses that have been previously embedded in the unconfirmed transaction by one or more other nodes of the plurality of nodes 110 in the blockchain network to create a chain of signatures that constitutes an independently-verifiable and unforgeable record of a routing path that the unconfirmed transaction 145 takes as it propagates across the peer-to-peer blockchain network. The computing system 105 or a second node 110 among the plurality of nodes 110 might validate the chain of signatures embedded in the transactions included in a block of a blockchain to confirm that the block itself is valid in accordance with a set of consensus rules of the blockchain.

In some embodiments, each node among the plurality of nodes 110 in the peer-to-peer blockchain network might be associated with a unique public/private key pair and a network address. In some cases, the unique public/private key pair might comprise a public key and a private key. In some instances, the network address of a node among the plurality of nodes 110 might contain information derived from the unique public/private key pair of the node (in some cases, the information is derived from the private key of the unique public/private key pair of the node, while in other cases (e.g., in some PKI systems with which the public key cannot necessarily be derived from the private, or the like), the information need not be derived from the private key itself), and a cryptographic signature of the node might be generated by using the private key of the unique public/private key pair of the node to sign a network address of a subsequent node among the plurality of nodes 110 to which the transaction is routed by the node.

According to some embodiments, the network address and the other network addresses might constitute a plurality of network addresses. In some cases, a network address associated with an originating node that originates the transaction might not be included in (or might be excluded from) the plurality of network addresses, based on a determination that information required to validate a cryptographic signature associated with the originating node is already included in the transaction. In alternative cases, a network address associated with the originating node might be included regardless of whether information required to validate a cryptographic signature associated with the originating node has already been included in the transaction. In some instances, the first node and the second node might be the same node. Alternatively, the first node and the second node might be different nodes.

In some embodiments, the computing system 105 or one or more third nodes among the plurality of nodes 110 might quantify a level of difficulty associated with producing a valid candidate block by reducing it to a burn fee, in accordance with a set of consensus rules of a blockchain. In some cases, the burn fee might be a cost denominated in a value of a token managed by the blockchain network. According to some embodiments, the computing system 105 or the one or more third nodes might quantify the value of one or more transactions being included in a candidate block by reducing it to a burn value, in accordance with the set of consensus rules of the blockchain. In some instances, the burn value might be a figure denominated in a value of a token managed by the blockchain network. In some embodiments, the computing system 105 or the one or more third nodes might determine whether a sum of individual burn values of the one or more transactions that are included in the candidate block is equal to or greater than the burn fee of the candidate block, in accordance with the set of consensus rules of the blockchain. Based on a determination that the sum of individual burn values of the one or more transactions that are included in the candidate block is equal to or greater than the burn fee of the candidate block, the computing system 105 or the one or more third nodes might determine that the candidate block is valid according to the set of consensus rules of the blockchain.

Figure 2A:
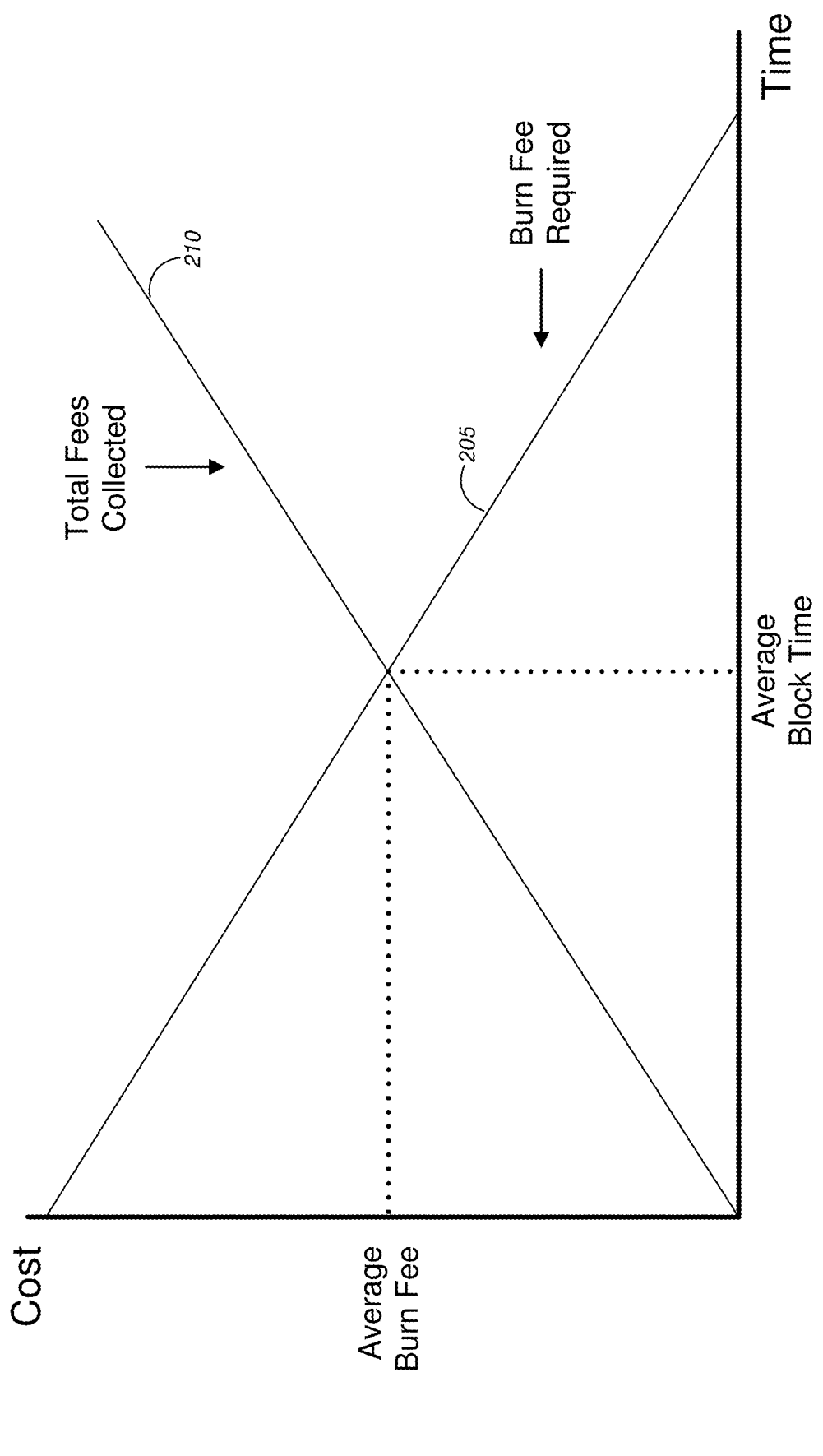
FIGS. 2A and 2B are graphical diagrams illustrating cost versus time curves depicting required burn fees compared with total collected fees during regular operation and during a reorganization attack, as part of a blockchain system that may be secured using proof of transactions, in accordance with various embodiments.
Figure 2B:
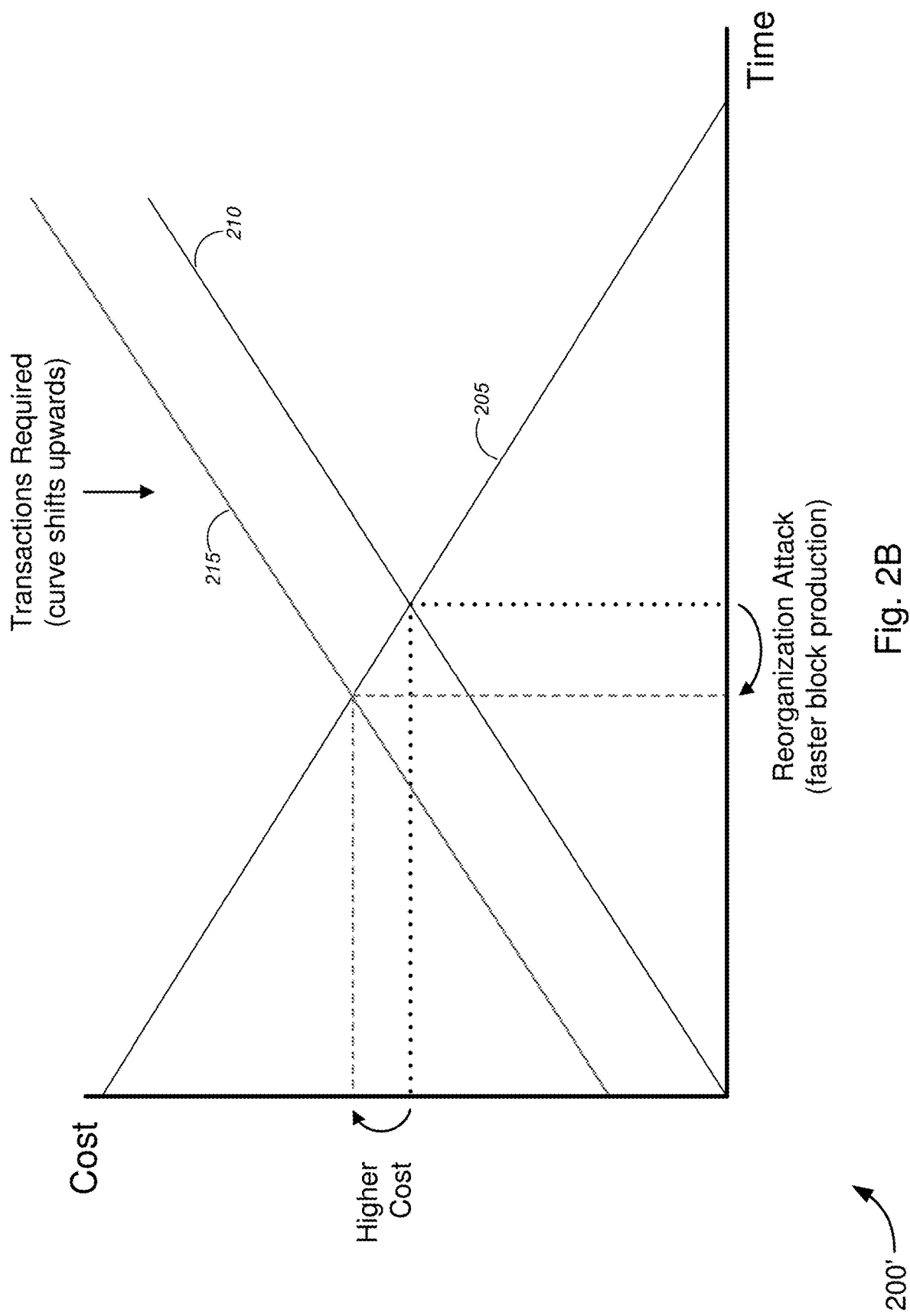

According to some embodiments, the burn fee might be algorithmically set by at least one computing system 105 or at least one node among the plurality of nodes 110 in the blockchain network. Alternatively, or additionally, a burn fee needed for production of a block might decrease over time in proportion to time elapsed since generation of a preceding block in the blockchain (as depicted in FIGS. 2A and 2B, which are further described below). In some cases, a burn value of a transaction might comprise a transaction fee paid by an originator of the transaction for inclusion of its transaction in the blockchain. In some instances, a burn value of a transaction might be adjusted depending on whether the transaction contains a valid chain of embedded cryptographic signatures establishing a route that the transaction has taken in its course of propagating across the blockchain network. In some cases, a burn value of a transaction might be adjusted downward depending on the number of hops that the transaction has made across the blockchain network, as measured by an embedded chain of cryptographic signatures contained within the transaction that document its course of transmission across the blockchain network. In some instances, the burn value of the transaction might be halved with each additional hop beyond a first hop that the transaction has made through the blockchain network from its point of origin to its point of inclusion in a block.

In some embodiments, at least a majority of the plurality of nodes 110 in the blockchain network might determine whether aggregate burn values of the transactions included in a block are sufficient to pay for the burn fee required for production of a block. Based on a determination that the aggregate burn values of the transactions included in the block are sufficient to pay for the burn fee required for the production of the block, the at least a majority of the plurality of nodes 110 in the blockchain network might determine that the block is valid and might include the block in a blockchain. In some instances, at least a portion of a difference in value between a burn value of a transaction included in a block and a burn fee needed to produce a block, as measured in the value of the token managed by the blockchain network, might be granted to a node among the plurality of nodes 110 that produces the block as a form of payment for producing the block. In some cases, at least a portion of the burn value of the one or more transactions included in the candidate block might be removed from circulation and not transferred to a node that produced the candidate block.

According to some embodiments, the computing system 105 or one or more fourth nodes among the plurality of nodes 110 within the blockchain network might prune all transaction slips in blocks in a blockchain preceding an arbitrary block identified according to consensus rules of the blockchain, and might calculate a value of all unspent tokens contained in all unpruned blocks preceding and including the last block being pruned. The computing system 105 or at least one node among the plurality of nodes 110 might adjust a monetary policy of the blockchain network so that the blockchain network would reintroduce (or recycle) the unspent tokens as tokens allocated in future blocks. In some cases, the unspent tokens might be reintroduced back into the blockchain network in a later block through use of golden tickets.

In some embodiments, the computing system 105 or a fifth node among the plurality of nodes 110 in the blockchain network might generate a golden ticket that contains a computational puzzle. The computing system 105 or a sixth node among the plurality of nodes 110 in the blockchain network might generate a solution to the computational puzzle in the golden ticket, where the solution to the computational puzzle might be used to select one or more network nodes among the plurality of nodes 110 in the blockchain network, in a manner that cannot be anticipated by the computing system 105 or the fifth node generating the golden ticket. In some instances, at least two of the first node, the second node, the third node, the fourth node, the fifth node, the sixth node, one of the selected one or more network nodes, and/or the computing system 105 might be the same node. Alternatively, the first node, the second node, the third node, the fourth node, the fifth node, the sixth node, the one of the selected one or more network nodes, and the computing system 105 might be different nodes. In some embodiments, the golden ticket might be at least one of included in a block published for inclusion in a blockchain or automatically associated with the block, and/or the like. In some cases, the golden ticket might include, without limitation, a random number that is created using data associated with the block. In some instances, the random number might comprise a cryptographic hash of data content contained within the block. In some cases, the solution to the golden ticket might be included in a block immediately following the block in which the golden ticket is included was published. In some instances, any valid blockchain might contain one or more golden tickets, each of which may be solved only once.

According to some embodiments, a block might contain only one solution to any particular golden ticket. In some cases, a block might contain only one golden ticket. In some instances, a block might contain a solution to only one golden ticket. In some cases, a block might be considered to be invalid based on a determination that the block contains a golden ticket solution that is invalid. In some instances, the solution to the computational puzzle in the golden ticket might comprise a product of a computationally difficult challenge that is independently verifiable by other nodes 110 in the blockchain network. In some cases, the solution to the computational puzzle in the golden ticket that is generated by the sixth node might be generated based on a hash of data associated with the golden ticket that meets validity criteria as defined in consensus rules of the blockchain.

In some embodiments, the solution to the computational puzzle in the golden ticket might be used to select one or more network nodes from a subset of network nodes among the plurality of network nodes 110 in the blockchain network that are identified as being valuable routing nodes with regard to production of a block containing the golden ticket. In some instances, routing nodes might be determined to be valuable based at least in part on data from a list of active routing nodes recorded within chains of cryptographic signatures and addresses embedded within transactions that are contained in the block containing the golden ticket. In some cases, the list of active routing nodes might be restricted to network nodes 110 that are recorded within chains of cryptographic signatures and addresses embedded within transactions that are included within the same block that contains a golden ticket. In some instances, a likelihood that the one or more network nodes are selected might be weighted according to a determination that the one or more network nodes are each perceived to contribute to health of the blockchain network as a whole, as measured based on consensus rules of the blockchain and using factors including at least one of a value of a transaction fee associated with each transaction or a burn value of a transaction.

In some instances, the computing system 105 or the sixth node among the plurality of nodes 110 in the blockchain network might broadcast the solution to the golden ticket throughout the blockchain network, the solution being included in a subsequent block that is produced and validated by the blockchain network. According to some embodiments, the computing system 105 or a node among the plurality of nodes 110 might distribute blockchain tokens to the one or more network nodes that are selected using the solution to the computational puzzle in the golden ticket. In some instances, an amount of tokens allocated through use of golden tickets might be equivalent to transaction fees paid in a block containing a golden ticket that contains a computational puzzle to which a solution has been generated. In some cases, an amount of tokens allocated through use of golden tickets might be equivalent to transaction fees paid in a block containing a golden ticket that contains a computational puzzle to which a solution has been generated, minus any value tokens allocated to a network node that generates the block containing the golden ticket, and adjusted to be plus or minus another amount determined by consensus rules of the blockchain to maintain a consistent money supply. In some cases, tokens allocated through use of golden tickets might be split between one or more network nodes that have provided solutions to golden tickets ("lucky miners") and one or more nodes selected by one or more solutions to the golden tickets ("lucky nodes"). In some instances, distribution of the tokens split between lucky miners and lucky nodes might be determined by a paysplit variable managed according to consensus rules of the blockchain, while a difficulty level of the computational puzzle might be determined using a difficulty variable managed according to the consensus rules of the blockchain.

In some cases, the difficulty variable might be adjusted to make selection of which network nodes to provide eligible solutions either more difficult or less difficult, where a higher difficulty corresponds to a reduced set of nodes that will be considered eligible to generate solutions under the consensus rules of the blockchain. In some instances, the computing system 105 or at least one of the nodes 110 might embed, within a solution to a golden ticket, a variable that indicates whether to increase, to hold constant, or to decrease a value of the difficulty variable managed according to the consensus rules of the blockchain. In some cases, the computational puzzle might establish a two-player chain, wherein the two-player chain established by the computational puzzles might be extended into a chain with an arbitrary number of participants, to perform at least one of providing additional randomness or splitting allocation of tokens into a finer distribution settling to more participants in the blockchain network.

In some embodiments, the computing system 105 or at least one of the nodes 110 might embed, within one of a block or a golden ticket, a variable that indicates whether to decrease, to hold constant, or to increase a value of a network consensus variable ("vote of the block" or "vote of the golden ticket"). In some cases, blocks that contain a vote of the block indicating whether to decrease or to increase a value of the network consensus variable might include only transactions that are consistent with the vote of the block indicating whether to decrease or to increase the value of the network consensus variable. In alternative embodiments, the computing system 105 or at least one of the nodes 110 might embed, within a solution to a golden ticket, a variable that indicates whether to decrease, to hold constant, or to increase a value of a network consensus variable ("vote of the golden ticket"). Alternatively, or additionally, the computing system 105 or at least one of the nodes 110 might embed, within a transaction, a variable that indicates whether to decrease, to hold constant, or to increase a value of a network consensus variable ("vote of the transaction").

As in other blockchains, users in the blockchain network of the various embodiments create transactions and broadcast them into a mesh grid that assembles these transactions into blocks and arranges these blocks into a sequential blockchain that represents the transaction history of the network, treating the longest chain at any time as the ledger of record. Unlike other types of blockchains, the methods according to the various embodiments change the class of nodes that have the right to bundle transactions into blocks.

As alluded to above, in traditional blockchains like Bitcoin and Ethereum™, the work of creating blocks is given to "miners" or "stakers" who assume financial risk for the right to issue blocks: contributing currency or hashpower to the network in a way that exposes them to the risk of losing money if they are unlucky or if they cheat the system, but that results in the network becoming more secure against attackers who wish to over-write payment or censor network activity. These nodes are not necessarily the same as the nodes that handle the majority of the traffic in the peer-to-peer system. In both networks, the nodes that focus on earning revenue generally "specialize."

In contrast to this traditional approach, in our approach, it is the regular nodes in the peer-to-peer network (namely, the ones that provide bandwidth and that collect and propagate transactions) that have the right to create blocks, incentivized to do so to secure the revenue associated with bundling transactions into blocks. To regulate the pace of block production and secure the system, it is necessary that this action cannot be free, and thus we specify that producing a block requires the payment of a "burn fee" that is set algorithmically by the network and denoted in the currency of the network token (the same token in which fees are paid). In the software developed to use this method, our algorithm sets this "burn fee" to a high value immediately after a block is found and decreases it gradually over time until it eventually hits zero, at which point any node on the network can produce a block free-of-charge. While this design eliminates the possibility of a "hash crash" by putting an upper-limit on the time between blocks, nodes are still expected to produce blocks as soon as the transaction fees they have in their mempool are greater than the "burn fee" required by the network (i.e., as soon as it is profitable). This economic dynamic is illustrated in FIG. 2A, as further described below.

It is easy to see how this results in an optimized block time: the pace of block production in our system is determined by the overall volume of transactions fees paid into the system as a whole. And while it is less obvious that this provides equivalent security to a proof-of-work system, consideration will show that it does: attackers who wish to re-write the main chain will not succeed unless they are capable of producing blocks at a faster pace than the network as a whole, something that in practice requires either access to a greater flow of transaction fees than the rest of the network combined, or a willingness on the part of the attacker to burn their own capital to create fake transactions that pay real fees. Either way, as FIG. 2B (which is further described below) illustrates, the cost of any attack on the network increases relative to the increase in speed that attackers need to achieve in block production to overcome the main chain's lead and build the longest-chain.

By creating a relationship between the speed of block production and the cost paid by nodes on the network, we create a lever we can use to make attacking the network prohibitively expensive. Our security dynamic is similar to that of other blockchains in the sense that attacking the network now requires attackers to expend significant resources. And to ensure that even minor increases in the pace of block production cost significant amounts of money, we specify that our network algorithmically adjusts its "burn fee" upwards over time to keep block time constant as transaction volume grows. Although any method which accomplishes this is fine, we handle it in practice by adjusting our burn fee up and down every N blocks so as to keep our desired equilibrium block time constant.

Figure 2C:
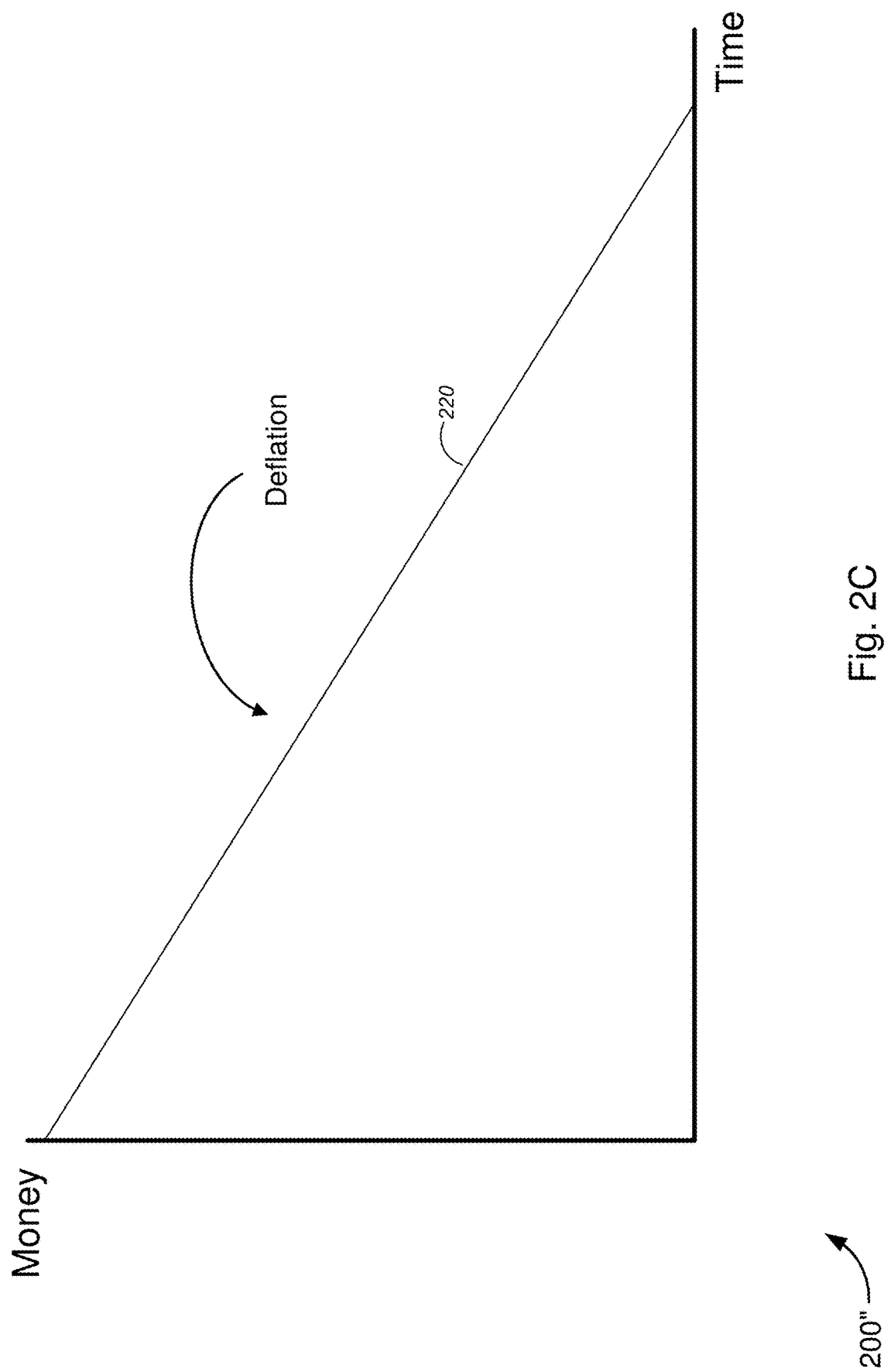
FIG. 2C is a graphical diagram illustrating a curve showing the destruction of the money supply over time in a blockchain that has a burn fee but no mechanism for re-injecting the burned tokens back into the network.

While this method works, and distributes the fees from transactions to the nodes that take part in the peer-to-peer propagation network, it creates an economic problem that we need to solve to implement it in practice. Specifically, our requirement that nodes pay a "burn fee" to create blocks necessarily results in a process of steady deflation (as depicted in FIG. 2C, which is further described below) that gradually destroys all of the currency in our system. To avoid these deflationary pressures, our system thus requires the provision of a separate mechanism to reintroduce our "burned" currency back into our system. But we cannot do this in any way that gives the block-issuing node any control over how these funds are dispersed. The reason for this is that if the same blocks that pay the "burn fees" can also influence the distribution of those fees, they can game or sibyl the network to lower their cost of producing future blocks, and thus their cost of attacking the network. Additionally, any ability for nodes to "subsidize" future block production with fees from a previous block turns the activity of block production into a thinly-disguised proof-of-work approach where the competitive advantage in block-issuance comes not from gathering transactions on the peer-to-peer network so much as devoting computational resources to gaming the system.

What this means in terms of blockchain design is that we must separate the act of producing blocks from the act of distributing funds. This is something new since in existing systems the fees and coinbase gathered by "miners" and "stakers" are issued to the nodes that produce the actual blocks. And our method for solving this problem is genuinely novel, working through the creation of a system that plays out between our two main classes of nodes (those that contribute to the peer-to-peer network and those that serve the security function of the system). And our method works by pitting these two classes of nodes against each other in a long-term struggle to control the distribution of revenue produced by the system. This struggle is systematized through a multi-player voting system that approves of changes to consensus network-wide settings like the percentage of the fee that goes to nodes in the peer-to-peer network versus the percentage of the fee that goes to the miners.

In practice, our own system works as follows. Every time a node produces a block, it collects what profit it can (the transaction fees it is allowed to use minus the required network burn fee) and bundles the remaining transaction fees it has collected into a "golden ticket" that contains a computational puzzle for the miners in the network to solve. In addition to producing this "golden ticket," the node that produces the block in our peer-to-peer network also includes a vote on whether to increase, decrease, or hold constant the share of the "burn fee" that will be distributed to "miners" as opposed to being distributed to the "nodes," where "miners" herein refers to nodes that choose to solve computational puzzles and "nodes" refers to nodes that provide bandwidth and connectivity in the peer-to-peer network. This vote over the distribution of income is referred to herein as the "paysplit vote." The consensus network determination of how fees are distributed is referred to herein as the "paysplit."

As nodes produce blocks and propagate them, miners examine the "golden tickets" (along with their paysplit votes) and choose for themselves which blocks they wish to support. If they decide they want to support a golden ticket, they must find a solution to a computationally difficult puzzle and share it with the rest of the network.

Although there are many possible variants for this puzzle, the computational puzzle that is selected for miners to solve, according to some non-limiting embodiments, includes, but is not limited to, the challenge of producing a public/private keypair that can sign a hash-value in a way that the resulting signature meets criteria that can be easily tested by the rest of the network. Miners, in some instances, are suggested to start with an SHA256 hash or the like of the contents of the golden ticket, with their challenge being appending to this hash their own public key and then signing the hash+key combination such that it produces a cryptographic signature (i.e., signing the results with their private key) where the final N digits in both the signature and the golden ticket hash value match, where N here is a consensus variable that is adjusted up or down by the network through a separate "difficulty vote" in a process that will be described shortly. The reason for using this method is that miners can publish the proof that they have found a solution into the network without providing the ability for other nodes or miners to steal it (since only the miner that found the proof has the necessary private key to create a valid signature, and since the public key is associated with the miner who found the solution). And yet all nodes can easily verify that the miner has indeed found a valid proof by simply checking the proffered signature against their public key.

All that is really needed in this puzzle is that the miners have the ability to solve a computationally-difficult task, the difficulty of which can be adjusted, and of which proof of success can be broadcast without sharing the ability for other players to copy the solution and thus steal the funds. Regardless of the specific puzzle chosen, we specify that should a miner choose to devote the computational effort required to solve one of these golden tickets, and should it succeed in actually finding a workable solution, the miner must propagate its solution back into the network as a regular fee-paying transaction in time for inclusion in the very next block (variations with longer time limits are permissible as well). Miner solutions to the golden ticket must include all of the information needed by third-parties to verify that the miner has solved the computational puzzle successfully, along with the previously mentioned second vote on whether to increase, decrease, or hold constant the difficulty of the computational puzzle itself ("difficulty vote").

Once a golden ticket is solved by a miner and its solution is included in the next block, the "burn fee" contained in the golden ticket is released to the network, split between the miner that found the solution and (a randomly selected) one of the nodes that participates in the peer-to-peer network and that propagates transactions according to the consensus paysplit values. And while any method for selecting this random node in the peer-to-peer network is acceptable as long as it rewards nodes that actually propagate and source transactions, in some embodiments of the current codebase, a hash-value produced in the miner solution may be used as a random input to an algorithm that selects a node that was involved in propagating one of the transactions found in the previous block, and whose address or public key can be found in the path-history of the transaction (as described further below). The logic of how and when fees are distributed is presented in FIG. 5, which is further described below.

Additionally, once a golden ticket has been solved and has been incorporated into the blockchain, the two votes that have been made in the process ("paysplit vote" and "difficulty vote") are then used as inputs by the network into an algorithm that periodically adjusts the consensus paysplit and difficulty settings for all subsequent blocks on that chain. The logic of how votes are generated and counted is presented in FIG. 6, which is further described below.

In practice, this dynamic creates a struggle between miners and nodes for the revenue created by the system, driving the network into a long-term equilibrium where revenue is distributed between the nodes in the peer-to-peer network and the miners "securing" the network according to the underlying economic costs of bandwidth and security provision. The security of the network is increased as the network grows and transaction volume grows regardless of the activity of the miners. But the miners nonetheless play an important role in preventing attacks, for the higher they drive the difficulty of solving the "golden tickets," the greater is the difficulty for any attacker to change the consensus paysplit and difficulty settings of the network in a way that will allow them to produce blocks at a faster pace than the main chain and thus launch a successful attack on it.

The dynamic described above is sufficient to secure the network. To strengthen it against more subtle attacks, a few other changes may optionally be implemented as well.

To encourage the levels of bandwidth and security provision provided by our multiple classes of nodes to reflect the needs of the users and applications on the network (rather than those of the nodes and miners themselves), we specify that users who send transactions into the network may optionally tag their transactions with a separate paysplit vote. And we specify that should a user-originated transaction contain a paysplit vote to either increase or decrease the consensus paysplit setting, it can only be included in a node-produced block that votes in the same direction.

To make attacks on the network more expensive and make it easier to identify which nodes are active in supporting the peer-to-peer network, we can also optionally have nodes sign transactions as they propagate through our network, creating an unforgeable history of the path each transaction that is included in the transaction and documents its transmission from its point of origin to its point of confirmation and inclusion in a block. We can also optionally specify that nodes are permitted to bundle any transaction in any block, but cannot use the fees paid by transactions against the "burn fee" they need to pay unless their own node can be found in the cryptographically signed transaction path for that specific transaction. Additionally, to make sibyl attacks on the network economically unproductive, we decrease the amount of the overall transaction fee that any node can allocate to its "burn fee" with each hop that a transaction takes through the network (with the remainder being simply added automatically to the golden ticket). And to prevent a subtle attack that involves hostile players manipulating network-wide changes in the burn fee to produce blocks at a faster pace than the rest of the network, the rules may stipulate that nodes prefer blocks that have a higher initial burn fee than blocks that have a lower burn fee at any particular block depth (i.e., if two blocks share the same block ID but one has a higher burn fee, the latter becomes the preferred block).

The Saito Network:

The blockchain system or approach described herein (also referred to herein as the "Saito Network," "Saito platform," or the like) is a cryptocurrency platform for applications that need to send large amounts of data across the blockchain. You can use it today to build "unastroturfable" Internet forums, decentralized social networks, pay-to-play websites, distributed data-routing services, peer-to-peer email hosting, SSH-key registries that are secure from MITM attacks, and/or the like.

On a technical level, the Saito platform described herein is notable for its use of a disposable blockchain, a proof-of-transactions system that splits network fees between bandwidth and security providers, and an economic incentive structure that protects the network from sibyl attacks and ensures that even attackers with overwhelming influence in any sector cannot dictate the behavior of the network as a whole.

The Disposable Blockchain:

As in other blockchains, users in the blockchain network described herein (i.e., the Saito Network) create transactions and broadcast them into a mesh grid that assembles them into sequential blocks, treating the longest chain as the ledger of record. While all transactions support basic payment functionality, they also include a signed "message" field where data can be bundled and read by applications that sit atop the network.

In the case of other blockchains, developers have been reluctant to permit users to include extra data in transactions out of fear of placing ever-increasing bandwidth and storage requirements on nodes. In the case of Bitcoin, this has led to conflict not only over the maximum block size, but even over the more trivial question of whether transactions should support a 40 or 80-byte OP_RETURN field.

For the Saito Network, we take for granted that even an 80-byte message field is hardly enough space for real-world applications, and our solution to the problem of data-creep is to use a disposable blockchain. In this system, the nodes in our network can simply throw out the oldest data in our ledger at predictable intervals, making it impossible for payment inputs to be used after an arbitrary length of time. Since the "genesis block" is always creeping forward there is no definitive starting time for the network, yet we do not consider this a major vulnerability because even Bitcoin users are vulnerable to chain-poisoning at their first point of contact (i.e., client software download). And there remain many ways for users to guard themselves against the risk of ending up on a minority fork: primarily by connecting to multiple trusted peers and monitoring the longest-chain. And cross-fork payment issues can also be avoided by the use of large-transaction "inception payments" (or payments-within-payments) in which the receiver only publishes the bundled payment to the blockchain once they can confirm they have access to the funds contained therein (i.e., as soon as they confirm they are on the same chain as the payment input). Here as elsewhere, extensible transactions allow creative ways to solve many problems that occur in other blockchains. And there is no practical limit to our creativity: we can even chain "inception payments" to include any number of participants, with the only limit being the point where the fees required for transmitting the transaction make the payment itself economically infeasible (i.e., the dreaded "limbo payment").

Our disposable blockchain gives the Saito network many advantages over alternate systems. Unlike Bitcoin, we do not face an ever-expanding UTXO set because so-called "dust transactions" (i.e., transactions that contain minuscule and unspendable amounts of bitcoins or tokens and that are encoded with human-readable, non-payment information into false addresses, or the like) are eliminated organically from our system over time. Uncertainty over what the network-wide rates of inflation and deflation are also avoided, since lost funds are recycled or reintroduced into future coinbase issuances and the exact amount of currency in circulation at any point is calculated. The risk of attackers launching long-term re-organization attacks is also lower with the Saito Network than with competing networks because many long-term attacks become impossible to pull-off with a disposable blockchain: attackers need not only produce a viable competing blockchain as elsewhere, but now also need to do so before the network collectively discards the block they are using as the basis for their proposed fork.

While a disposable blockchain helps solve the technical challenges involved in scaling up transaction sizes, there are two more fundament economic problems we need to solve as well: the "tragedy of the commons" problem that is caused when transaction fees do not cover the true cost of long-term data storage, and the "free rider" problem that exists when miners (who provide transaction irreversibility) are paid out of fees while nodes (which provide bandwidth and open-access) are expected to operate on a volunteer basis. Because the bandwidth requirements of running a Saito node increase with transaction sizes, both problems will be intractable in our network unless we find some way to pay for node provision in addition to network security. This is a hard problem because the amount of funding we need for each group of actors depends entirely on economic pressures and not on technical ones. The problem is further complicated because the distribution of fees cannot be made arbitrarily as with Bitcoin but must instead be driven by a mechanism that allows the actual economic demands of applications for security vis-a-vis open access and connectivity to be reflected in the fee-distribution mechanism. On top of all of this, our solution must also be secure against attack, and drive all actors in the network to promote the welfare of the network even as it drives them to maximize their private profits.

The Solution:

As with Bitcoin, nodes in the Saito Network create blocks to secure the fees associated with bundling transactions. Unlike Bitcoin, the cost of producing a block is not the arbitrary expenditure of "hash power" but rather a "burn fee" that is set algorithmically by the network. In some embodiments, this "burn fee" is set to a high value immediately after a block is found and decreases in stepwise fashion until it eventually hits zero, at which point any node on the network can produce a block free-of-charge. While this design eliminates the possibility of a "hash crash" by putting an upper-limit on the time between blocks, nodes are still expected to produce blocks faster on average: as soon as the transaction fees they have in their mempool are greater than the "burn fee" required by the network (i.e., as soon as it is profitable). This is shown in FIG. 2A, as further described below.

It is easy to see how this results in an optimized block time: the pace of block production is determined by the volume of transactions fees paid into the system as a whole. And while it is less obvious that this provides equivalent security to a proof-of-work system, consideration will show that it does: attackers who wish to re-write the main chain will not succeed unless they are capable of producing blocks at a faster pace. And this means in practice that they will need either a greater flow of transaction fees than the rest of the network combined, or be willing to burn their own capital to make up the difference: creating fake transactions that nonetheless burn real fees. As FIG. 2B illustrates, the cost any attack thus depends on how quickly the attackers need to produce blocks to overcome the main chain.

To ensure that even minor and temporary increases in the pace of block production cost significant amounts of money, the Saito Network automatically adjusts its "burn fee" upwards over time to keep block time constant as transaction volume grows. One subtle benefit of this design is that attacking the network grows more expensive the more transactions it serves, essentially creating a virtuous cycle that encourages economic activity to concentrate on the most secure chain. Another more subtle advantage of this approach is that by quantifying the costs of any attack, users and applications can gauge for themselves whether security is adequate or inadequate for their needs. Yet another subtle benefit of this design is that long-term attacks become far much expensive to pull-off than short-term chain re-organizations, since the pace of block production in long-term chain re-writes needs to be significantly higher than in short-term ones in order for attackers to pull off a network-wide chain re-organization before their forking-off-block is discarded from the ledger.

Of course, there is also an issue we need to overcome, as depicted in FIG. 2C. As can be seen in FIG. 2C, any network that relies upon nodes to "burn capital" to issue blocks will eventually run out of funds. We can avoid this by adding a coinbase to our system, but as long as the block-finding node has any influence over how funds are distributed (as is the case in other blockchains), a savvy attacker can sibyl or otherwise game the block-finding process to increase their chances of capturing the revenue. If we were to use the new block hash value to randomly distribute funds between nodes in the network, for instance, an attacker could experiment with producing multiple valid blocks until it found one that benefited it individually. And this design thus fails our requirement that economic incentives need to promote the welfare of the system as whole, since any flaw of this nature not only reduces the cost of a re-organization attack (encouraging attackers to subsidize their attacks with recycled money), but also transforms our network into a thinly-disguised proof-of-work system, one in which nodes now compete to earn profits not by processing transactions efficiently so much as expending resources to sibyl/game the network.

Fortunately, we have a solution to this problem, and it constitutes one of the major innovations of the Saito Network. And it is remarkable since in addition to making it impossible for nodes to game currency issuance, and thus enable proof-of-transactions as a secure alternative to both proof-of-stake and proof-of-work, our method also secures the network against sibyl attacks, ensures that nodes continually optimize the distribution of transactions through the system, and creates a system that naturally allocates fees between bandwidth and security providers in the most efficient way possible. This solution is the incorporation of a system in our fee-distribution process that ensures good behavior by the three players in the network: users, nodes, and miners. And then we ensure that the resulting dynamic always protects the network by ensuring that any two parties can always collude to balance the overweening influence of a predominant third.

The Struggle for Profit:

Our system begins with a zero-sum battle between nodes and miners for the "burn fees" paid by our nodes during the course of block-creation. This system works as follows:

Every time a node produces a block, it collects what profit it can and bundles the remaining fees into a "golden ticket" that contains a computational puzzle for miners to solve, along with a vote on whether to increase, decrease, or hold constant the share of the burn fee that will ultimately be distributed to miners instead of randomly to one of the bandwidth-providing nodes in the network ("paysplit"). Miners choose themselves whether to solve these golden tickets, but finding a solution is not enough, for should a miner succeed in solving one, it must propagate its solution back into the network as a fee-paying transaction for inclusion in the very next block. As part of this solution, the miner may also make a secondary vote on whether to increase, decrease or hold constant the difficulty of the computational puzzle.

From these simple rules, a remarkable development ensues. The struggle to control the network in our two-player system requires a delicate dance between collusion and cooperation for both nodes and miners alike. For while nodes and miners both want to generate at least one solution per golden ticket (because otherwise no one gets paid), their interests otherwise diverge: miners prefer a high paysplit and high difficulty level, while nodes prefer a low paysplit and low difficulty level. While the reason for their disagreement over paysplit is obvious, that for their difference of opinion on mining difficulty is more subtle: miners prefer a high difficulty as that reduces the expected competition they face from their peers and thus lowers the expected transaction fee they need to pay to induce nodes to prefer their solution (i.e., increasing their "take-home" share of the burn-fee); nodes meanwhile prefer a low difficulty rate not only because inter-miner competition increases the fees paid to them (and speeds up the pace of block production in the process, further securing their own income) but also because easier golden tickets hold out the salivating prospect that nodes may be able to select between multiple solutions and even pick one that rewards them.

According to some embodiments, it may be specified that once a golden ticket is solved by a miner and their solution is included by a node, the coinbase funds in the ticket are released to the two winners of the activity, and the votes over paysplit and difficulty take effect. And this is another point where the Saito Network diverges from all existing cryptosystems. Strategically, the fact that votes in our network pass back and forth between nodes and miners, and require implicit approval from both groups to take effect, pushes us into a dynamic where nodes and miners must collude to protect their group interests (refusing to process the harmful votes of their counterparties) while using their own clout to promote friendly blocks. Yet collusion is difficult because both parties can also induce defection from the other side. Nodes can pad their golden ticket with extra funds to induce hashing support from renegade miners, while miners can propagate their solutions with higher fees to bribe support from nodes.

Whereas most cryptocurrencies work as technical games, the Saito Network plays out as a zero-sum economic battle that is fundamentally unsolvable. For the competition between our two groups is ultimately not driven based on algorithmic factors so much as competitive pressures to collude to protect long-term profits. Yet, because cartelization inevitably pushes up profits and because our system is open-by-design, excessive profit cannot survive over the long-term: any side that succeeds in driving up class income will simultaneously invite the market to provide more of the desired value, whether by inducing miners to enter the market, or inducing nodes to take advantage of a high paysplit and "pull the trigger" on block production faster than their peers.

Our two-player system will eventually reach equilibrium at the point where the security provided by miners is optimal given their relative costs of collusion, but we acknowledge that this level is arbitrary and may not reflect the amount of security (or bandwidth) desired by the applications on the network, something especially relevant given that our demand for security from miners decreases naturally as the volume of transactions grows. And so, in some embodiments, we introduce a third party whose market preferences ensure we hit an optimal economic distribution of fees between nodes and miners. This third party consists of the users who make up the network, and who are allowed by the network to tag their transactions with an optional paysplit vote. Should a user-originated transaction contain a paysplit vote, the system insists that it can only be included in a block that votes in the same direction. Users who choose to take sides in this ongoing struggle between nodes and miners thus sacrifice the reliability and speed of transaction confirmation but gain marginal influence over the direction of the network by increasing the flow of capital to the party that represents its interests in the central two-player system.

Our resulting three-party system is thus unsolvable. Miners are perhaps the most influential party at small scale but lose influence as the volume of transactions grows (adding a secondary level of security) and it becomes easier for nodes to collude (i.e., harder for miners to operate their own nodes). And while the user/application influence is arguably weakest at the beginning, it ultimately becomes the most powerful influence on the network. And yet even with any group at its apex, no particular group is ever fully ascendant, for any two players in our system can always collude to protect the network from the overweening influence of the third player.

Security in the Saito Network:

The dynamic described above is sufficient to secure the network. To make attacks more expensive, we have nodes sign transactions as they pass them through the network, creating an unforgeable history of the path each transaction takes to its point of confirmation. We also decrease the amount of the transaction fee available to nodes with each hop a transaction takes through the network. And we specify that the node that benefits from the node portion of the golden ticket is selected from one of the recorded participants according to a random input variable provided as part of the mining solution.

These additional restrictions secure our network from common attacks visible in other cryptocurrencies that are— oddly—not often recognized as attacks. In our system, for instance, transactions are naturally valuable to nodes that participate in the P2P network and useless to attackers that "lurk" on the edges. The fact that nodes must participate in the P2P network prevents an under-provision of connectivity and defends the network against subtle attacks on open-access like those posed by the Bitcoin FIBRE network, a closed relay that benefits colluding participants by undermining the profitability of those who mine on the P2P network. Sibyl attacks are also eliminated over time, because nodes themselves are incentivized to purge sibyls from profitable transaction paths; and in routing around them they increase the robustness of the network as whole. Nodes pay other nodes for connectivity in the form of valuable transaction flow, and transaction hoarding becomes a minority strategy since even the nodes that merely participated in propagating a transaction have a chance at winning the node-share of the golden ticket.

Security is also reinforced by the incentive structure of our system. For one, if network security falls too low, all parties can increase it by simply agreeing to pay miners more. Greater pay for miners encourages them to support the threatened chain in the long-run, while the increased competition attracted by the fattened paysplit speeds up block issuance on the threatened chain. Even in situations where the network is not under active attack, the miner/node battle over the paysplit vote also serves a "canary in the coalmine" function, encouraging miners themselves to issue an alternate chain if they control enough hashpower to outcompete the main chain. Rather counterintuitively, it is the threat and possibility of short-term miner attacks that forces the network to keep its short-term security levels high enough that it is protected from long-term attacks.

And since it is theoretically possible for a stealth chain to tweak its paysplit and difficulty settings to lower its overall cost of block production, our difficulty vote plays an equally important role in warding off attacks. The reason for this is that because miners need to solve "golden tickets" in order for the network to "approve" consensus changes to the paysplit/difficulty settings, higher difficulty levels force attackers to devote more time and money to changing consensus settings. Properly understood, this offers a significant improvement over the security of Bitcoin's proof-of-work function, since our network is protected not only by the need for attackers to have the financial resources to generate transaction volume, but also now by a miner-protected voting mechanism that requires significant hashpower to overcome. And it stipulates that the main chain— saving a total collapse in user, miner and node activity—will always be able to change its own network settings more quickly than attackers can manipulate their own.

There are many subtle attacks and responses that flow out of our system. But most responses are obvious. One unlikely but possible attack is an attacker burning capital to manipulate the burn fee of the main chain up, and then continuing to produce blocks on a lower-difficulty stealth chain at a faster pace than the main network can adjust its burn fee downwards again. This can be avoided by having nodes arbitrarily prefer blocks that have a higher initial burn fee than their competitors at any particular block depth.

In any event, blockchain security is not just about protecting users from reorganization attacks, it also implies censorship resistance. And in this field, even a successful attack on the network is not able to accomplish much beyond driving up the price of network token while amassing the resources for an attack on the network. Extremely wealthy attackers can burn cash to censor transactions, but they can do this in Bitcoin as well (by pricing out competing transactions). And even if an attack does overwrite a substantial portion of the blockchain, most of the transactions they overwrite can be almost immediately bundled onto the end of the winning chain by the nodes that initially published them, where they then add to the security of the now-longest chain. And with users shifting from direct payments to "inception payments" in the face of greater network insecurity, and exchanges scrambling to increase their support for miners in the face of greater risk, losses from any reorganization attack will disproportionately affect miners and nodes. Of course, the network can promptly recover unless the attacker has essentially limitless financial resources, in which case users can simply sell their tokens for profit and move to a network fork.

On a final note, we also observe that by forcing the network to deal with only a finite amount of data at any time, we are also protected from a huge class of software development risks. Whereas other blockchains deal with enormous scalability problems driven by their need to develop custom code to enable scaling, the fact that the Saito Network need only store a limited amount of transactional data (and can always reduce this period as our transaction volume grows) keeps the software requirements on the scale where existing industrial databases and other components can be leveraged. In-memory databases already scale into the hundreds of terabytes, and there is no risk of server requirements expanding beyond the amount that an independent server can handle, given the predictable income stream generated from the work of storing and processing transaction data.

These and other aspects or features of the various embodiments are described in detail below with respect to FIGS. 2A-7C.

FIGS. 2A and 2B are graphical diagrams illustrating cost versus time curves 200 and 200' depicting required burn fees compared with total collected fees during regular operation and during a reorganization attack, as part of a blockchain system that may be secured using proof of transactions, in accordance with various embodiments. FIG. 2C is a graphical diagram illustrating a curve showing the destruction of the money supply over time in a blockchain that has a burn fee but no mechanism for re-injecting the burned tokens back into the network.

FIG. 2A depicts how the "proof of transactions" approach described herein, which includes the implementation of a "burn fee," works. The Y-axis measures the "burn fee" that must be paid to produce a block in a blockchain, while the X-axis measures the amount of time that has passed since the last block was produced. As the amount of time since the last block was produced increases, the burn fee decreases in amount (as depicted by curve 205 in FIG. 2A) while the number of transaction fees available to the blocks (and thus the total fees collected) increases (as depicted by curve 210 in FIG. 2A). As more time passes, additional transactions are expected to enter the network. The expected block time is approximately at the intersection between these two curves 205 and 210 (as depicted in FIG. 2A by the vertical dotted line), when it becomes profitable for nodes to issue blocks.

FIG. 2B depicts how the dynamics of the various embodiments cause attacks to the system (e.g., reorganization attacks or the like) to become expensive. Attacking any blockchain requires producing more blocks in a set amount of time than can be produced by the rest of the network. This requires producing more blocks in the same period of time, or producing blocks at a faster pace. As FIG. 2B illustrates, given a fixed burn fee (i.e., a burn fee value along the curve 205), increasing the speed of block production might be achieved by shifting the supply curve 210 upwards (as shown by curve 215), which requires the attacker either to have access to more fee-paying transactions than the rest of the network combined or to create their own fake transactions that nonetheless pay real fees (e.g., spending capital, or the like). As shown in FIG. 2B, with faster block production (as in a reorganization attack), the cost of production of the block increases (as depicted by the curved arrows shifting from the vertical and horizontal dotted lines to the vertical and horizontal dashed lines).

FIG. 2C depicts an issue with creating a proof-of-transactions-based system that uses a burn fee to regulate the speed and cost of block production. That is, the security of the system depends on production of blocks by nodes being made costly. But, allowing nodes to burn capital to produce blocks commits the network to a long-term deflationary spiral that gradually destroys the economy. In time, the network runs out of money and economic activity collapses.

The solution to this problem requires separating the act of injecting money into the blockchain ecosystem from the act of generating blocks. FIGS. 3B-7C below illustrate how fee and coinbase distribution might be used to achieve this solution.

Figure 3A:
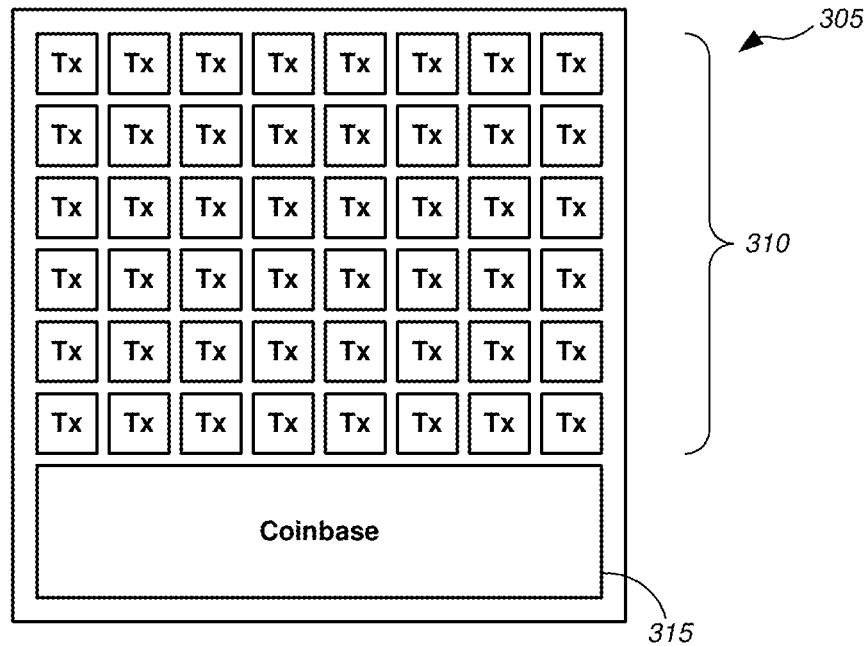
FIG. 3A is a schematic diagram illustrating an example of a conventional block including a plurality of transactions and a coinbase.

FIG. 3A is a schematic diagram illustrating an example 300 of a conventional block including a plurality of transactions and a coinbase. In particular, FIG. 3A depicts a schematic of the structure of a block 305 in a traditional blockchain, including a plurality of tokens 310 (each of which might represent a transaction, a message, or data, or the like) and a coinbase 315. In the traditional blockchain, the coinbase 315—which represents new money being injected into the economy, as well as implicitly representing the aggregate fees paid by the transactions in the block—is part of the block 305 itself and is rewarded to the node that produces it.

Figure 3B:
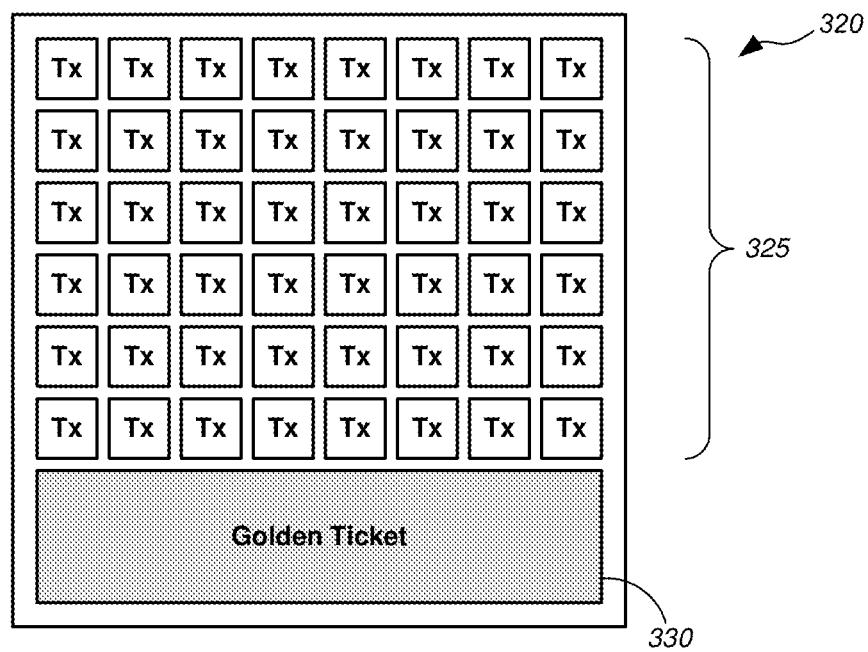
FIG. 3B is a schematic diagram illustrating an example of a block including a plurality of transactions and a golden ticket, the block being part of a blockchain system, in accordance with various embodiments.

This is a problem for the proof-of-transaction approach (as described herein) as it works against the requirement that producing a block be made expensive for the nodes in the peer-to-peer network. To solve this issue, the act of producing a block should be separated from the act of distributing the funds that are pushed into the fee for producing the block. FIG. 3B depicts a block that incorporates features that address this issue.

FIG. 3B is a schematic diagram illustrating an example 300' of a block including a plurality of transactions and a golden ticket, the block being part of a blockchain system (in some non-limiting embodiments, part of the blockchain system of FIG. 1 or the like), in accordance with various embodiments. In particular, FIG. 3B depicts a schematic of the structure of a block 320 in a blockchain in accordance with the various embodiments. The block 320 might include a plurality of tokens 325 (which is similar to tokens 310; each of which might represent a transaction, a message, or data, or the like) and a golden ticket 330 (which is distinct from the coinbase 315). Rather than providing the nodes that produce the blocks with access to the fees and the coinbase associated with such blocks, the funds are instead bundled into computational puzzles that must be solved by other entities in the network (e.g., miners) in order for the funds to be released. This computational puzzle is referred to herein as a "golden ticket."

Figure 4:
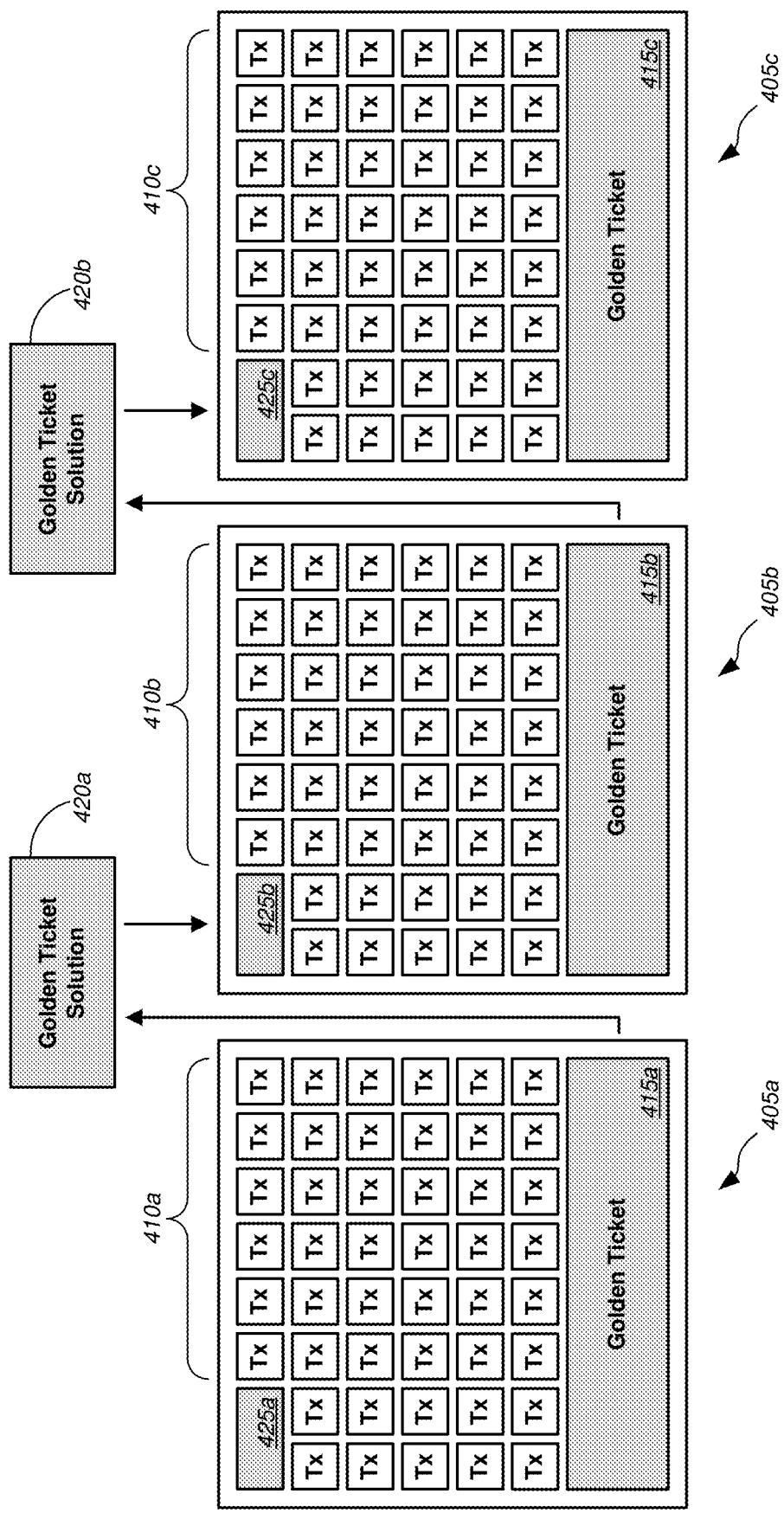
FIG. 4 is a schematic diagram illustrating a portion of a blockchain including a plurality of blocks, each block including a plurality of transactions and a golden ticket, the blockchain being part of a blockchain system, in accordance with various embodiments.

FIG. 4 is a schematic diagram illustrating a portion of a blockchain 400 including a plurality of (consecutive) blocks 405a-405c (collectively, "blocks 405" or the like), each block including a plurality of tokens 410a, 410b, or 410c (collectively, "tokens 410" or the like) and a golden ticket 415a, 415b, or 415c (collectively, "golden ticket 415" or the like), the blockchain 400 being part of a blockchain system (in some non-limiting embodiments, part of the blockchain system 100 of FIG. 1 or the like), in accordance with various embodiments. Although not shown, the blocks 405a-405c might be located at the beginning of the blockchain, located at the end of the blockchain, or disposed somewhere in between.

The non-limiting embodiment of FIG. 4 illustrates how a golden ticket creates a two-player activity between a node and a miner. Nodes produce blocks 405, while miners solve the golden tickets 415 created by the nodes. Other nodes subsequently include the solutions 420a or 420b (collectively, "golden ticket solutions 420," "solutions 420," or the like) to the golden tickets 415 into subsequent blocks—in some cases, as shown by golden ticket solution fields 425b or 425c (also 425a; collectively, "golden ticket solution fields 425," "solution fields 425," or the like). According to some embodiments, to create more fee competition between miners if difficulty levels are too low, only one solution to any golden ticket might be included in the blockchain.

Figure 5:
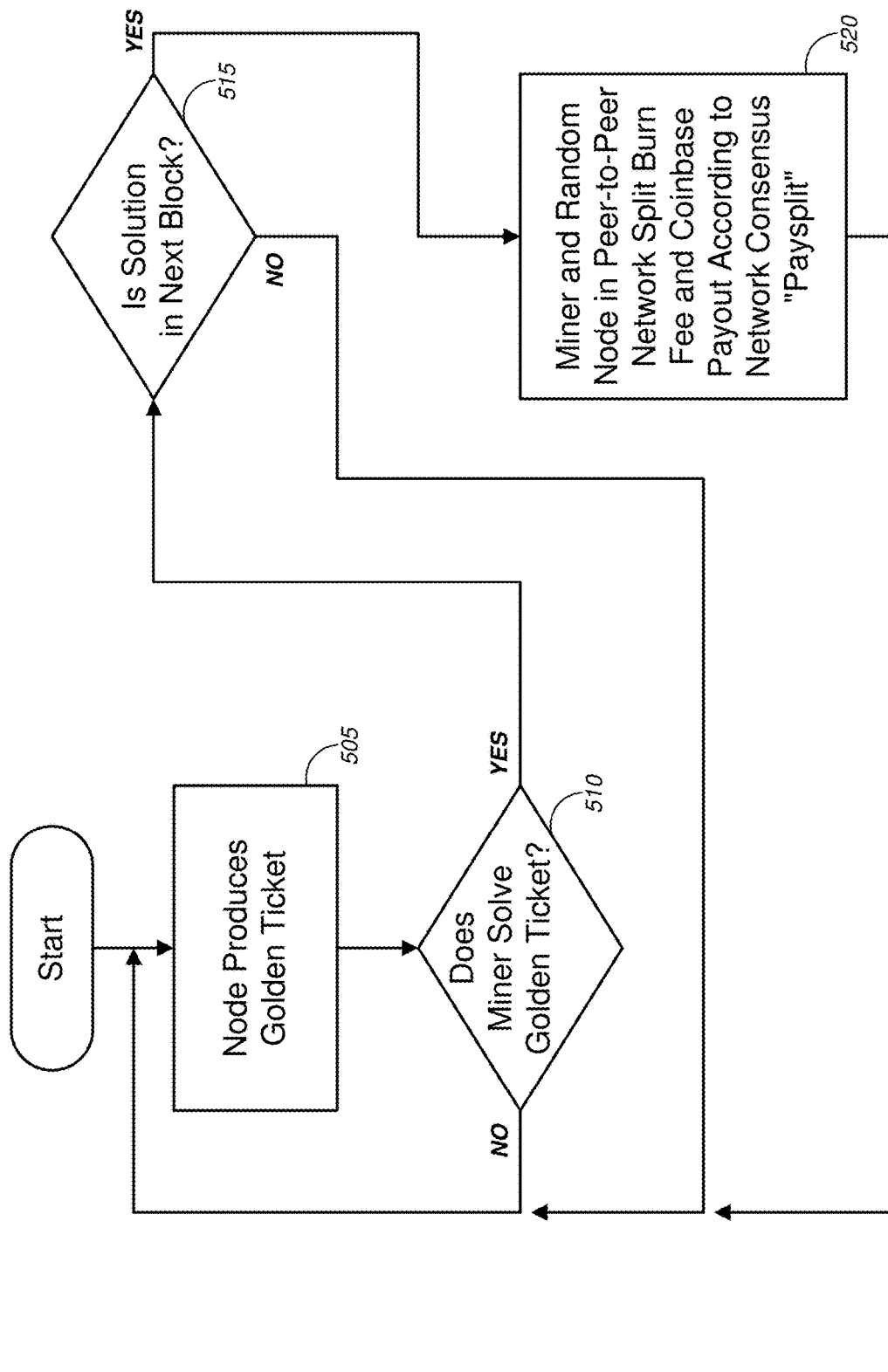
FIG. 5 is a block diagram illustrating distribution of burn fees and coinbase payout as part of a method for securing a blockchain with proof-of-transactions, in accordance with various embodiments.

FIG. 5 is a block diagram illustrating distribution of burn fees and coinbase payout as part of a method 500 for securing a blockchain with proof-of-transactions, in accordance with various embodiments. In the non-limiting embodiment of FIG. 5, method 500 illustrates how the "burn fees" and optional "coinbase" that are locked into the "golden ticket" are distributed based on the independent choices of the nodes and miners in the system. Importantly, the funds that are locked into the golden ticket are only released to the winning node and the miner after the miner has solved the golden ticket and after the solution has been embedded or incorporated in the next block in the blockchain.

Referring to FIG. 5, method 500 might include producing, with a node, a golden ticket (block 505). Method 500 might further comprise determining whether a miner has solved the golden ticket (block 510). If not, the process returns to block 505. If so, the process continues to block 515, in which the method 500 might further comprise determining whether the solution is embedded or incorporated in the next block in the blockchain. If not, the process returns to block 505. If so, the process continues to block 520, in which the method 500 might comprise splitting (and distributing) the burn fee and coinbase payout to the miner that solved the golden ticket and a randomly selected node in the peer-to-peer network, in accordance with network consensus "paysplit." Here, the randomly selected node might be a node selected from among a plurality of nodes within the peer-to-peer network that participate in propagating or relaying a transaction (that once confirmed or validated is included in a block of the blockchain), or the like.

In the event that a golden ticket is not solved, the funds that are lost to the network as a result can be recycled back into the economy through future coinbase issuances attached to future golden tickets.

Figure 6:
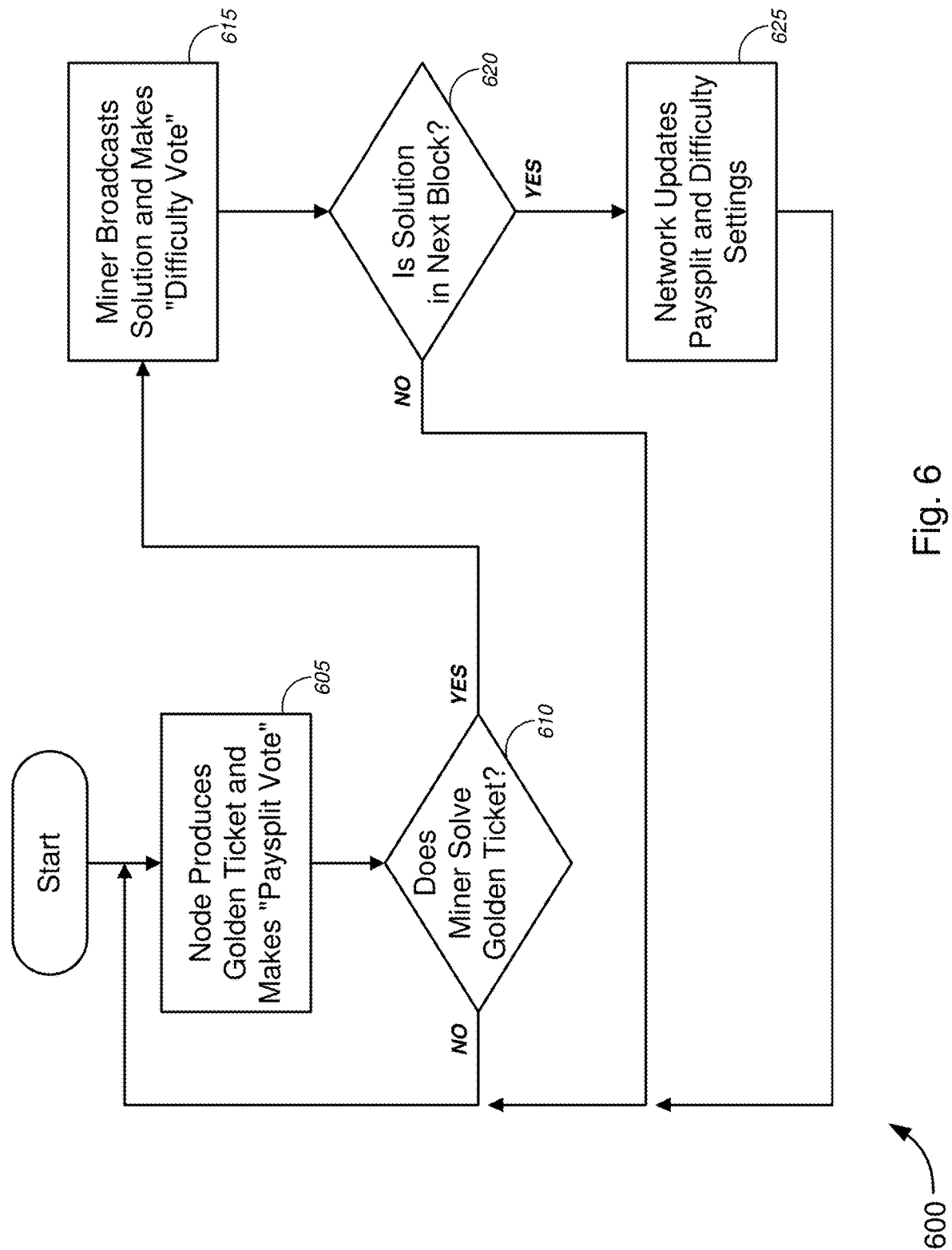
FIG. 6 is a block diagram illustrating paysplit voting and difficulty voting as part of another method for securing a blockchain with proof-of-transactions, in accordance with various embodiments.

FIG. 6 is a block diagram illustrating paysplit voting and difficulty voting as part of another method 600 for securing a blockchain with proof-of-transactions, in accordance with various embodiments. In the non-limiting embodiment of FIG. 6, method 600 illustrates how voting dynamics of the various embodiments interact with the "golden ticket" system (i.e., how the network uses the "golden ticket" process to make collective decisions about changing the consensus "paysplit" and "difficulty" levels for the network as a whole).

With reference to FIG. 6, method 600 might include producing, with a node, a golden ticket, the node making a "paysplit vote" (block 605). The "paysplit vote" might be a choice by nodes whether to increase, to hold constant, or to decrease the share of the golden ticket reward allocated to miners. Method 600 might further comprise determining whether a miner has solved the golden ticket (block 610). If not, the process returns to block 605. If so, the process continues to block 615, in which the method 600 might comprise broadcasting, with the miner, the solution, the miner making a "difficulty vote." The "difficulty vote" might be a choice by miners whether to increase, to hold constant, or to decrease the difficulty of the mining puzzle. Method 600 might further comprise determining whether the solution is embedded or incorporated in the next block in the blockchain (block 620). If not, the process returns to block 605. If so, the process continues to block 625, in which the method 600 might comprise updating, with the network, paysplit and difficulty settings. The paysplit and difficulty votes only become effective and contribute to changing the consensus settings once they have been included in the solution to a golden ticket and incorporated in the blockchain.

Although not shown, according to some embodiments, users who initiate or participate in transactions might be provided with the ability to tag their transactions with an optional paysplit vote (either replacing the paysplit vote of the node or contributing to the paysplit vote of the node). In some cases, where the paysplit vote of the node and the users are considered, an average of the vote might be used to determine a resultant paysplit vote that determines how much of the paysplit goes to the miner who solves the golden ticket and how much goes to a randomly selected node that participates in propagation of the transactions.

Figure 7A:
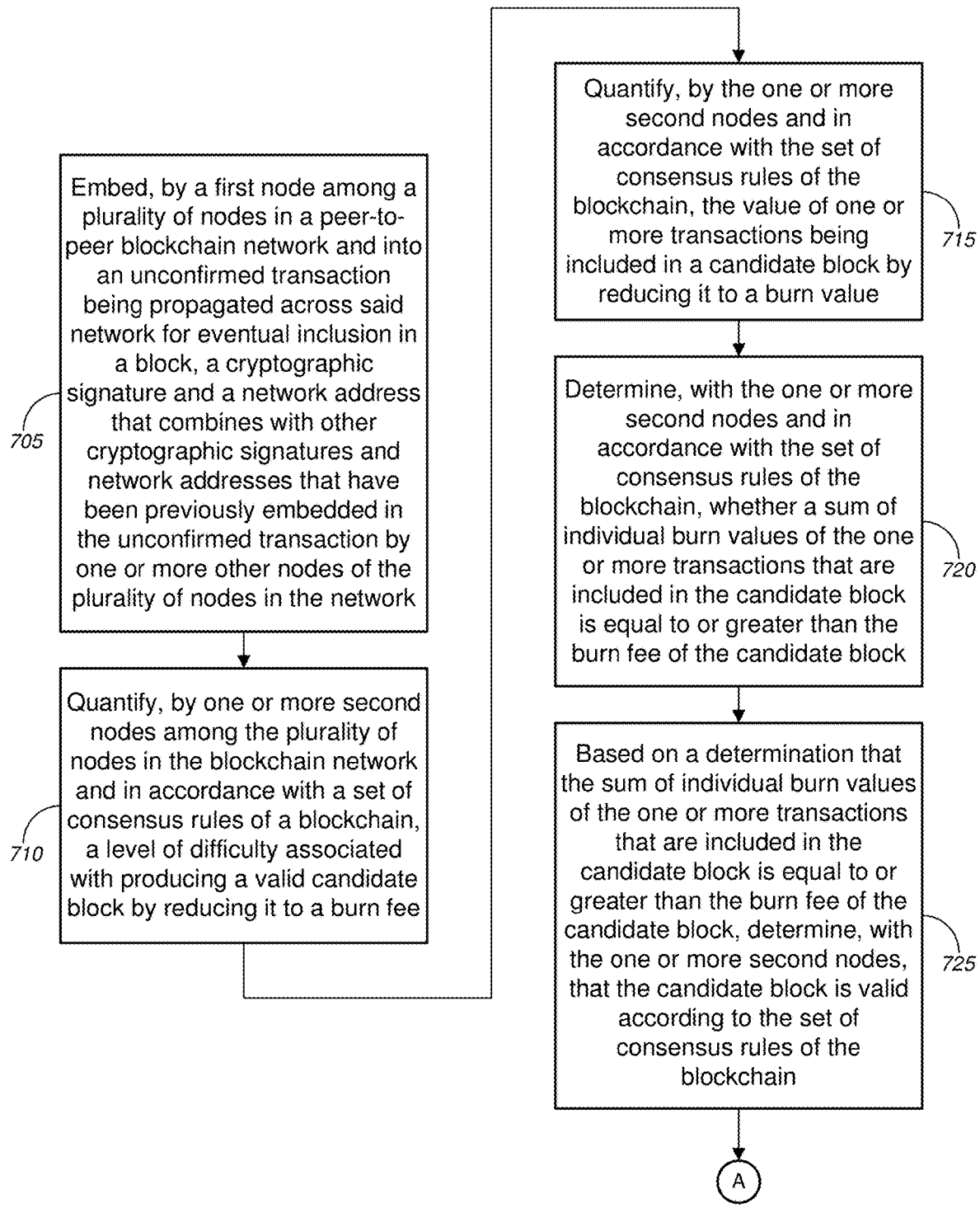
FIGS. 7A-7C are flow diagrams illustrating a method for securing a blockchain with proof-of-transactions, in accordance with various embodiments.
Figure 7B:
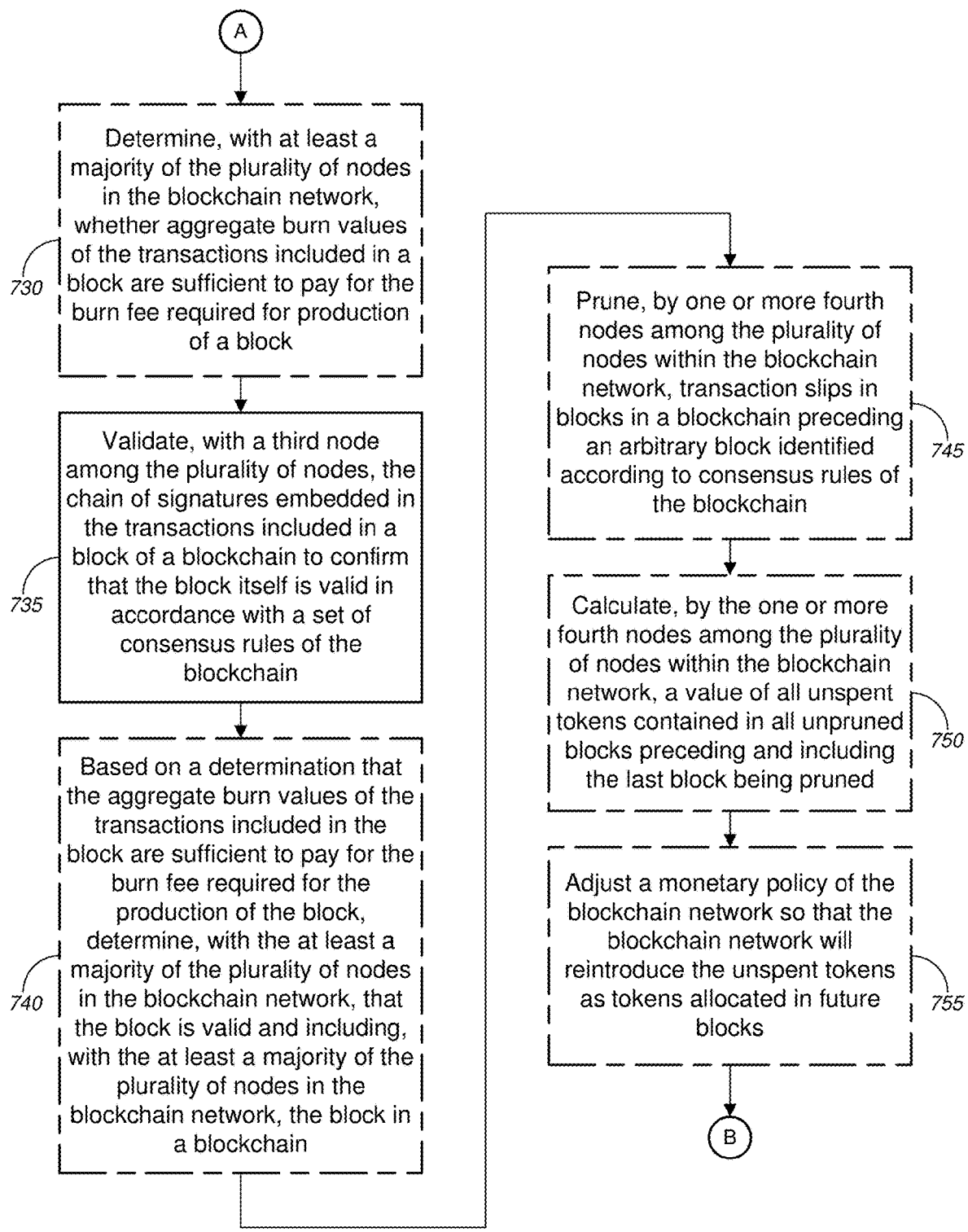
Figure 7C:
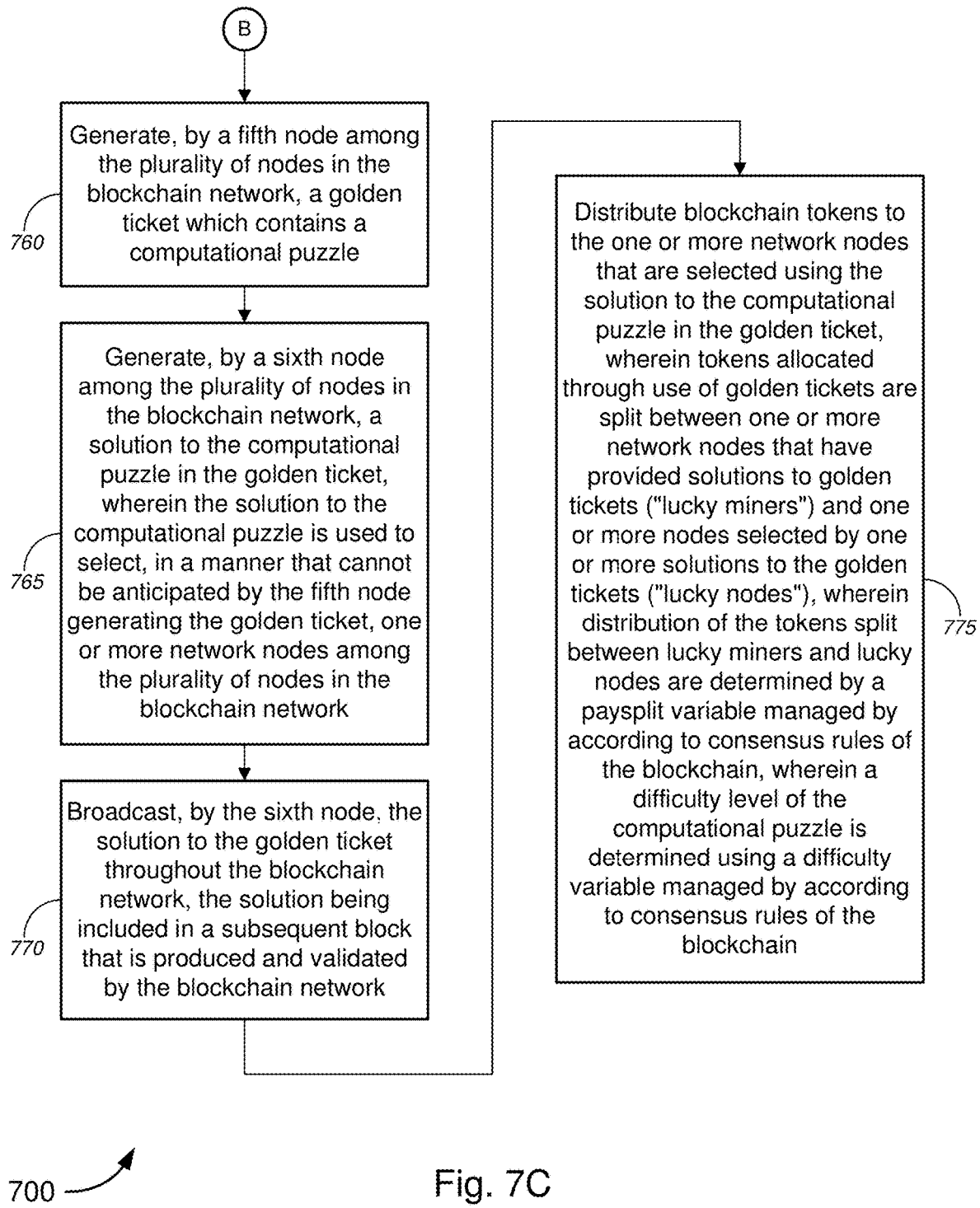

FIGS. 7A-7C (collectively, "FIG. 7") are flow diagrams illustrating a method 700 for securing a blockchain with proof-of-transactions, in accordance with various embodiments. Method 700 of FIG. 7A continues onto FIG. 7B following the circular marker denoted, "A," which continues onto FIG. 7C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems, examples, or embodiments 100, 200, 200', 200", 300', 400, 500, and 600 of FIGS. 1, 2A, 2B, 2C, 3B, 4, 5, and 6, respectively (or components thereof), such methods may also be implemented using any suitable hardware (or software) implementation. Similarly, while each of the systems, examples, or embodiments 100, 200, 200', 200", 300', 400, 500, and 600 of FIGS. 1, 2A, 2B, 2C, 3B, 4, 5, and 6, respectively (or components thereof), can operate according to the method 700 illustrated by FIG. 7 (e.g., by executing instructions embodied on a computer readable medium), the systems, examples, or embodiments 100, 200, 200', 200", 300', 400, 500, and 600 of FIGS. 1, 2A, 2B, 2C, 3B, 4, 5, and 6 can each also operate according to other modes of operation and/or perform other suitable procedures In the non-limiting embodiment of FIG. 7A, method 700, at block 705, might comprise embedding, by a first node among a plurality of nodes in a peer-to-peer blockchain network and into an unconfirmed transaction being propagated across said network for eventual inclusion in a block, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network.

In some embodiments, each node among the plurality of nodes in the peer-to-peer blockchain network might be associated with a unique public/private key pair and a network address. In some cases, the unique public/private key pair might include, without limitation, a public key and a private key. The network address of a node among the plurality of nodes might contain information derived from the unique public/private key pair of the node, and a cryptographic signature of the node might be generated by using the private key of the unique public/private key pair of the node to sign a network address of a subsequent node among the plurality of nodes to which the transaction is routed by the node.

According to some embodiments, the network address and the other network addresses might constitute a plurality of network addresses. A network address associated with an originating node that originates the transaction might not be included in the plurality of network addresses, based on a determination that information required to validate a cryptographic signature associated with the originating node is already included in the transaction. In some cases, the first node and the second node are the same node. Alternatively, the first node and the second node might be different nodes within the blockchain network.

Method 700 might further comprise quantifying, by one or more second nodes among the plurality of nodes in the blockchain network and in accordance with a set of consensus rules of a blockchain, a level of difficulty associated with producing a valid candidate block by reducing it to a burn fee, where the burn fee is a cost denominated in a value of a token managed by the blockchain network (block 710) and quantifying, by the one or more second nodes and in accordance with the set of consensus rules of the blockchain, the value of one or more transactions being included in a candidate block by reducing it to a burn value, where the burn value is a figure denominated in a value of a token managed by the blockchain network (block 715). At block 720, method 700 might comprise determining, with the one or more second nodes and in accordance with the set of consensus rules of the blockchain, whether a sum of individual burn values of the one or more transactions that are included in the candidate block is equal to or greater than the burn fee of the candidate block. Method 700 might comprise, at block 725, based on a determination that the sum of individual burn values of the one or more transactions that are included in the candidate block is equal to or greater than the burn fee of the candidate block, determining, with the one or more second nodes, that the candidate block is valid according to the set of consensus rules of the blockchain.

According to some embodiments, the burn fee might be algorithmically set by at least one computing system in the blockchain network. In some cases, a burn fee needed for production of a block might decrease over time in proportion to time elapsed since generation of a preceding block in the blockchain. In some instances, a burn value of a transaction might include a transaction fee paid by an originator of the transaction for inclusion of its transaction in the blockchain. According to some cases, a burn value of a transaction might be adjusted depending on whether the transaction contains a valid chain of embedded cryptographic signatures establishing a route that the transaction has taken in its course of propagating across the blockchain network. According to some instances, a burn value of a transaction might be adjusted downward depending on the number of hops that the transaction has made across the blockchain network, as measured by an embedded chain of cryptographic signatures contained within the transaction that document its course of transmission across the blockchain network. In some cases, the burn value of the transaction might be halved with each additional hop beyond a first hop that the transaction has made through the blockchain network from its point of origin to its point of inclusion in a block.

In some embodiments, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some instances, at least a portion of the burn value of the one or more transactions included in the candidate block might be removed from circulation and not transferred to a node that produced the candidate block.

Method 700 might continue onto the process at optional block 730 in FIG. 7B following the circular marker denoted, "A." At optional block 730 in FIG. 7B (following the circular marker denoted, "A"), method 700 might comprise determining, with at least a majority of the plurality of nodes in the blockchain network, whether aggregate burn values of the transactions included in a block are sufficient to pay for the burn fee required for production of a block. At block 735, method 700 might comprise validating, with a third node among the plurality of nodes, the chain of signatures embedded in the transactions included in a block of a blockchain to confirm that the block itself is valid in accordance with a set of consensus rules of the blockchain. Method 700, at optional block 740, might comprise, based on a determination that the aggregate burn values of the transactions included in the block are sufficient to pay for the burn fee required for the production of the block, determining, with the at least a majority of the plurality of nodes in the blockchain network, that the block is valid and including, with the at least a majority of the plurality of nodes in the blockchain network, the block in a blockchain.

According to some embodiments, method 700 might further comprise pruning, by one or more fourth nodes among the plurality of nodes within the blockchain network, transaction slips in blocks in a blockchain preceding an arbitrary block identified according to consensus rules of the blockchain (optional block 745); calculating, by the one or more fourth nodes among the plurality of nodes within the blockchain network, a value of all unspent tokens contained in all unpruned blocks preceding and including the last block being pruned (optional block 750); and adjusting a monetary policy of the blockchain network so that the blockchain network will reintroduce the unspent tokens as tokens allocated in future blocks (optional block 755). In some embodiments, the unspent tokens might be reintroduced back into the blockchain network in a later block through use of golden tickets. Method 700 might continue onto the process at block 760 in FIG. 7C following the circular marker denoted, "B."

At block 760 in FIG. 7C (following the circular marker denoted, "B"), method 700 might comprise generating, by a fifth node among the plurality of nodes in the blockchain network, a golden ticket that contains a computational puzzle. Method 700 might further comprise generating, by a sixth node among the plurality of nodes in the blockchain network, a solution to the computational puzzle in the golden ticket, where the solution to the computational puzzle is used to select, in a manner that cannot be anticipated by the fifth node generating the golden ticket, one or more network nodes among the plurality of nodes in the blockchain network (block 765). Method 700, at block 770, might comprise broadcasting, by the sixth node, the solution to the golden ticket throughout the blockchain network, the solution being included in a subsequent block that is produced and validated by the blockchain network. Method 700 might further comprise, at block 775, distributing blockchain tokens to the one or more network nodes that are selected using the solution to the computational puzzle in the golden ticket.

In some embodiments, the fifth node and the sixth node might be the same node. Alternatively, the fifth node and the sixth node might be different nodes. In some cases, the golden ticket might be at least one of included in a block published for inclusion in a blockchain or automatically associated with the block, or the like. In some instances, the golden ticket might comprise a random number that is created using data associated with the block. In some cases, the random number might comprise a cryptographic hash of data content contained within the block. In some instances, the solution to the golden ticket might be included in a block immediately following the block in which the golden ticket is included was published.

Merely by way of example, according to some embodiments, any valid blockchain might contain one or more golden tickets, each of which may be solved only once. In some cases, a block might contain only one solution to any particular golden ticket. In some instances, a block might contain only one golden ticket. In some cases, a block might contain a solution to only one golden ticket. In some instances, a block might be considered to be invalid based on a determination that the block contains a golden ticket solution that is invalid.

In some embodiments, the solution to the computational puzzle in the golden ticket might comprise a product of a computationally difficult challenge that is independently verifiable by other nodes in the blockchain network. In some cases, the solution to the computational puzzle in the golden ticket that is generated by the sixth node might be generated based on a hash of data associated with the golden ticket that meets validity criteria as defined in consensus rules of the blockchain.

In some instances, the solution to the computational puzzle in the golden ticket is used to select one or more network nodes from a subset of network nodes among the plurality of nodes in the blockchain network that are identified as being valuable routing nodes with regard to production of a block containing the golden ticket. According to some embodiments, routing nodes might be determined to be valuable based at least in part on data from a list of active routing nodes recorded within chains of cryptographic signatures and addresses embedded within transactions that are contained in the block containing the golden ticket. In some cases, the list of active routing nodes might be restricted to network nodes that are recorded within chains of cryptographic signatures and addresses embedded within transactions that are included within the same block that contains a golden ticket. In some instances, a likelihood that the one or more network nodes are selected might be weighted according to a determination that the one or more network nodes are each perceived to contribute to health of the blockchain network as a whole, as measured based on consensus rules of the blockchain and using factors including at least one of a value of a transaction fee associated with each transaction or a burn value of a transaction.

According to some embodiments, an amount of tokens allocated through use of golden tickets might be equivalent to transaction fees paid in a block containing a golden ticket that contains a computational puzzle to which a solution has been generated. In alternative embodiments, an amount of tokens allocated through use of golden tickets might be equivalent to transaction fees paid in a block containing a golden ticket that contains a computational puzzle to which a solution has been generated, minus any value tokens allocated to a network node that generates the block containing the golden ticket, and adjusted to be plus or minus another amount determined by consensus rules of the blockchain to maintain a consistent money supply.

In some cases, tokens allocated through use of golden tickets might be split between one or more network nodes that have provided solutions to golden tickets ("lucky miners") and one or more nodes selected by one or more solutions to the golden tickets ("lucky nodes"). In some instances, votes to adjust variables contained in one of a block, the golden ticket, or the solution might be used to adjust a value of consensus variables once the solution to the golden ticket is included in the block and tokens are allocated to the lucky node and lucky miner in the blockchain network. In some cases, distribution of the tokens split between lucky miners and lucky nodes might be determined by a paysplit variable managed according to consensus rules of the blockchain. In some embodiments, the paysplit variable might be adjusted to direct one of a greater proportion or a lesser proportion of the blockchain tokens being distributed to the one or more network nodes that are selected. In some cases, the method 700 might further comprise embedding, within one of a block or a golden ticket, a variable that indicates whether to increase, to hold constant, or to decrease a value of the paysplit variable managed according to the consensus rules of the blockchain. In some instances, blocks that contain a vote of the block indicating one of to decrease or to increase a value of the paysplit variable might include only transactions that are consistent with the vote of the block indicating the one of to decrease or to increase the value of the paysplit variable.

According to some embodiments, method 700 might further comprise embedding, within a transaction, a variable that indicates whether to increase, to hold constant, or to decrease a value of the paysplit variable managed according to the consensus rules of the blockchain. In some cases, a difficulty level of the computational puzzle might be determined using a difficulty variable managed according to consensus rules of the blockchain. In some instances, the difficulty variable might be adjusted to make selection of which network nodes to provide eligible solutions one of more difficult or less difficult, where a higher difficulty might correspond to a reduced set of nodes that will be considered eligible to generate solutions under the consensus rules of the blockchain. In some cases, method 700 might further comprise embedding, within a solution to a golden ticket, a variable that indicates whether to increase, to hold constant, or to decrease a value of the difficulty variable managed according to the consensus rules of the blockchain.

In some embodiments, the computational puzzle might establish a two-player chain, where the two-player chain established by the computational puzzles might be extended into a chain with an arbitrary number of participants, to perform at least one of providing additional randomness or splitting allocation of tokens into a finer distribution settling to more participants in the blockchain network. In some instances, the method 700 might further comprise embedding, within one of a block or a golden ticket, a variable that indicates whether to decrease, to hold constant, or to increase a value of a network consensus variable ("vote of the block" or "vote of the golden ticket"). In some cases, blocks that contain a vote of the block indicating one of to decrease or to increase a value of the network consensus variable might include only transactions that are consistent with the vote of the block indicating the one of to decrease or to increase the value of the network consensus variable.

According to some embodiments, method 700 might further comprise embedding, within a solution to a golden ticket, a variable that indicates whether to decrease, to hold constant, or to increase a value of a network consensus variable ("vote of the golden ticket"). Alternatively, or additionally, method 700 might further comprise embedding, within a transaction, a variable that indicates whether to decrease, to hold constant, or to increase a value of a network consensus variable ("vote of the transaction").

Figure 8A:
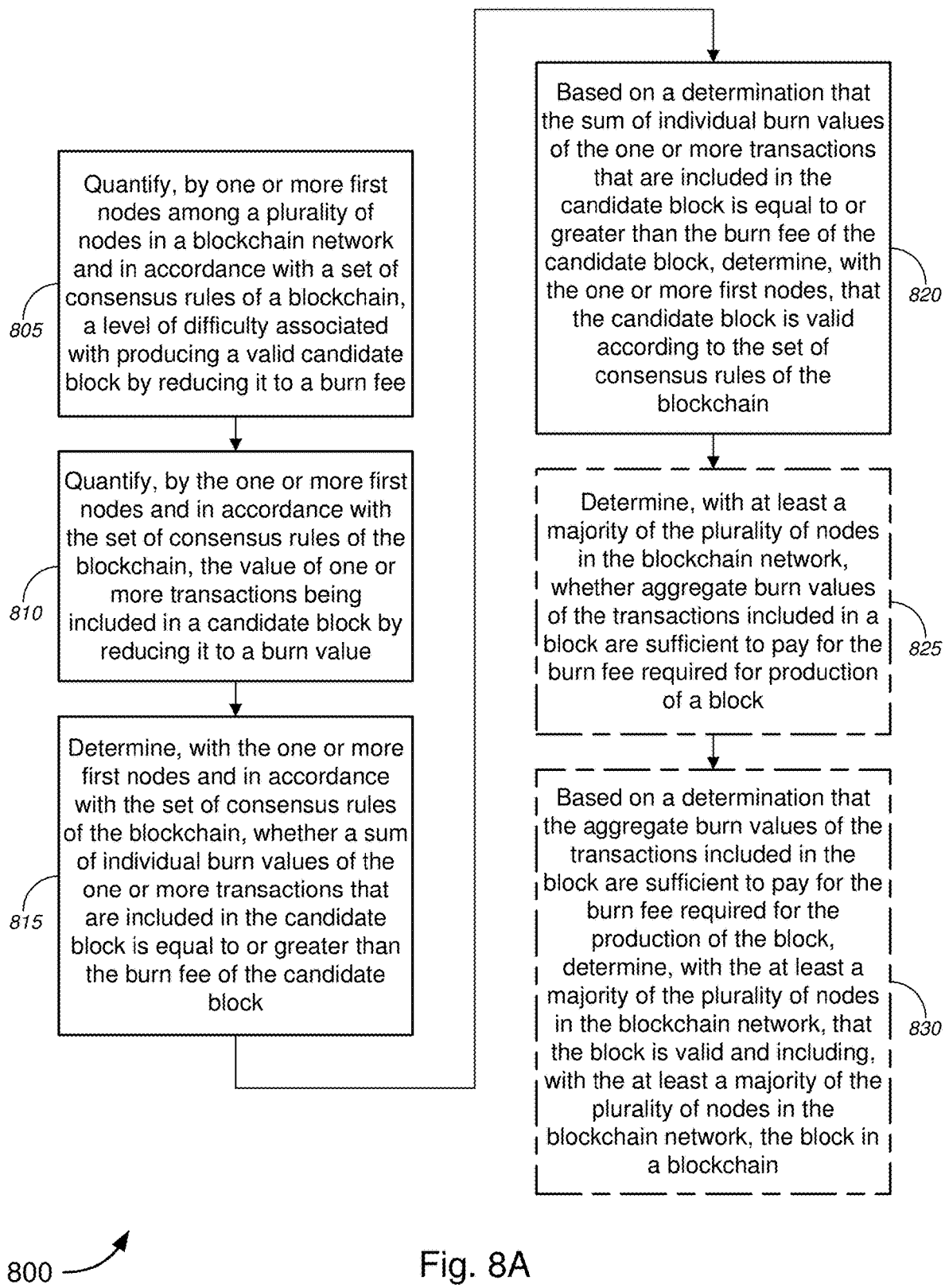
FIGS. 8A and 8B are flow diagrams illustrating another method for securing a blockchain with proof-of-transactions, in accordance with various embodiments.
Figure 8B:
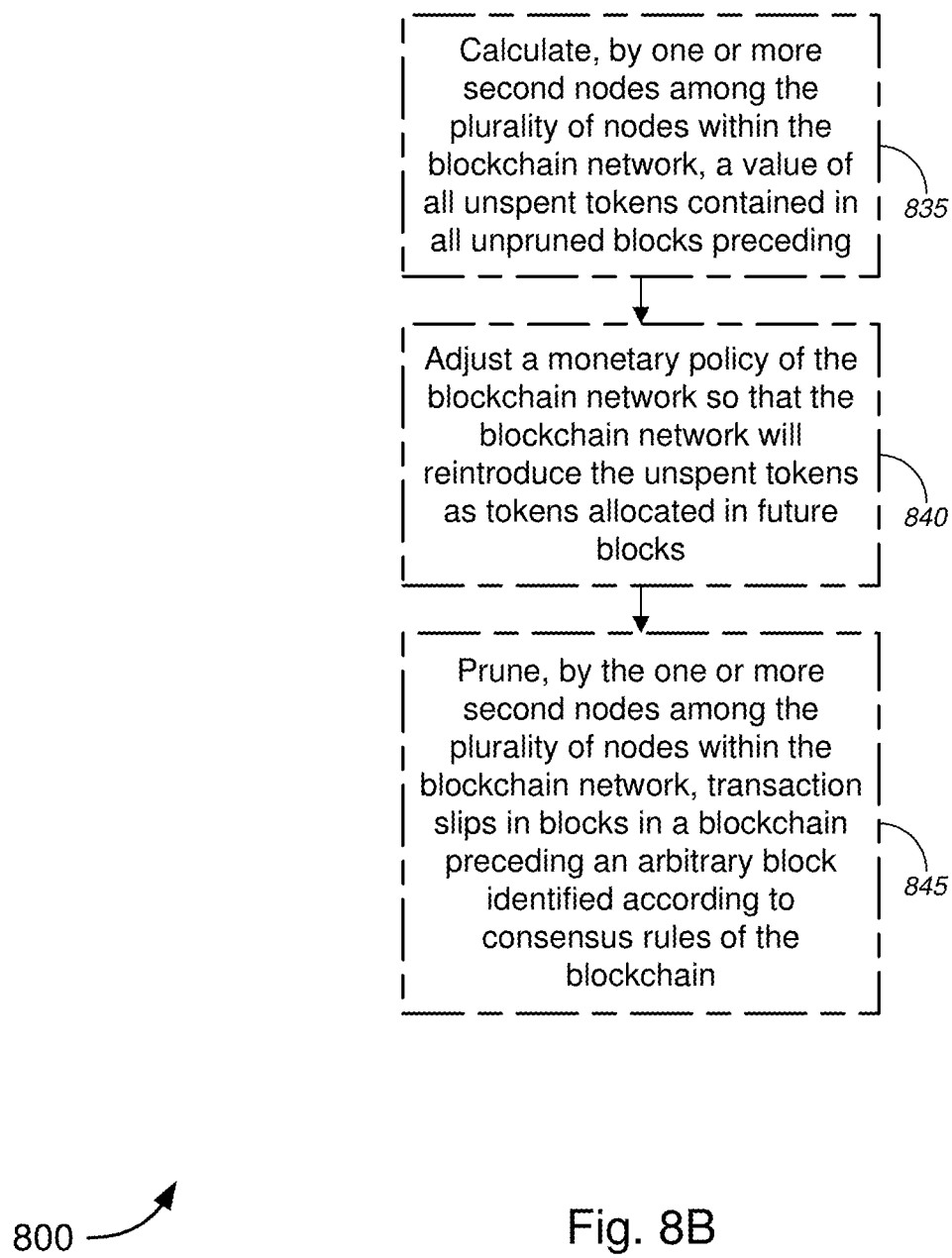

FIGS. 8A and 8B (collectively, "FIG. 8") are flow diagrams illustrating another method 800 for securing a blockchain with proof-of-transactions, in accordance with various embodiments.

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the systems, examples, or embodiments 100, 200, 200', 200", 300', 400, 500, and 600 of FIGS. 1, 2A, 2B, 2C, 3B, 4, 5, and 6, respectively (or components thereof), such methods may also be implemented using any suitable hardware (or software) implementation. Similarly, while each of the systems, examples, or embodiments 100, 200, 200', 200", 300', 400, 500, and 600 of FIGS. 1, 2A, 2B, 2C, 3B, 4, 5, and 6, respectively (or components thereof), can operate according to the method 800 illustrated by FIG. 8 (e.g., by executing instructions embodied on a computer readable medium), the systems, examples, or embodiments 100, 200, 200', 200", 300', 400, 500, and 600 of FIGS. 1, 2A, 2B, 2C, 3B, 4, 5, and 6 can each also operate according to other modes of operation and/or perform other suitable procedures In the non-limiting embodiment of FIG. 8A, method 800 might comprise quantifying, by one or more first nodes among a plurality of nodes in a blockchain network and in accordance with a set of consensus rules of a blockchain, a level of difficulty associated with producing a valid candidate block by reducing it to a burn fee, where the burn fee is a cost denominated in a value of a token managed by the blockchain network (block 805) and quantifying, by the one or more first nodes and in accordance with the set of consensus rules of the blockchain, the value of one or more transactions being included in a candidate block by reducing it to a burn value, where the burn value is a figure denominated in a value of a token managed by the blockchain network (block 810). At block 815, method 800 might comprise determining, with the one or more first nodes and in accordance with the set of consensus rules of the blockchain, whether a sum of individual burn values of the one or more transactions that are included in the candidate block is equal to or greater than the burn fee of the candidate block. Method 800 might comprise, at block 820, based on a determination that the sum of individual burn values of the one or more transactions that are included in the candidate block is equal to or greater than the burn fee of the candidate block, determining, with the one or more first nodes, that the candidate block is valid according to the set of consensus rules of the blockchain.

According to some embodiments, the burn fee might be algorithmically set by at least one computing system in the blockchain network. In some cases, a burn fee needed for production of a block might decrease over time in proportion to time elapsed since generation of a preceding block in the blockchain. In some instances, a burn value of a transaction might include a transaction fee paid by an originator of the transaction for inclusion of its transaction in the blockchain. According to some cases, a burn value of a transaction might be adjusted depending on whether the transaction contains a valid chain of embedded cryptographic signatures establishing a route that the transaction has taken in its course of propagating across the blockchain network. According to some instances, a burn value of a transaction might be adjusted downward depending on the number of hops that the transaction has made across the blockchain network, as measured by an embedded chain of cryptographic signatures contained within the transaction that document its course of transmission across the blockchain network. In some cases, the burn value of the transaction might be halved with each additional hop beyond a first hop that the transaction has made through the blockchain network from its point of origin to its point of inclusion in a block.

In some embodiments, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some instances, at least a portion of the burn value of the one or more transactions included in the candidate block might be removed from circulation and not transferred to a node that produced the candidate block.

At optional block 825, method 800 might comprise determining, with at least a majority of the plurality of nodes in the blockchain network, whether aggregate burn values of the transactions included in a block are sufficient to pay for the burn fee required for production of a block. Method 800, at optional block 830, might comprise, based on a determination that the aggregate burn values of the transactions included in the block are sufficient to pay for the burn fee required for the production of the block, determining, with the at least a majority of the plurality of nodes in the blockchain network, that the block is valid and including, with the at least a majority of the plurality of nodes in the blockchain network, the block in a blockchain.

Figure 9:
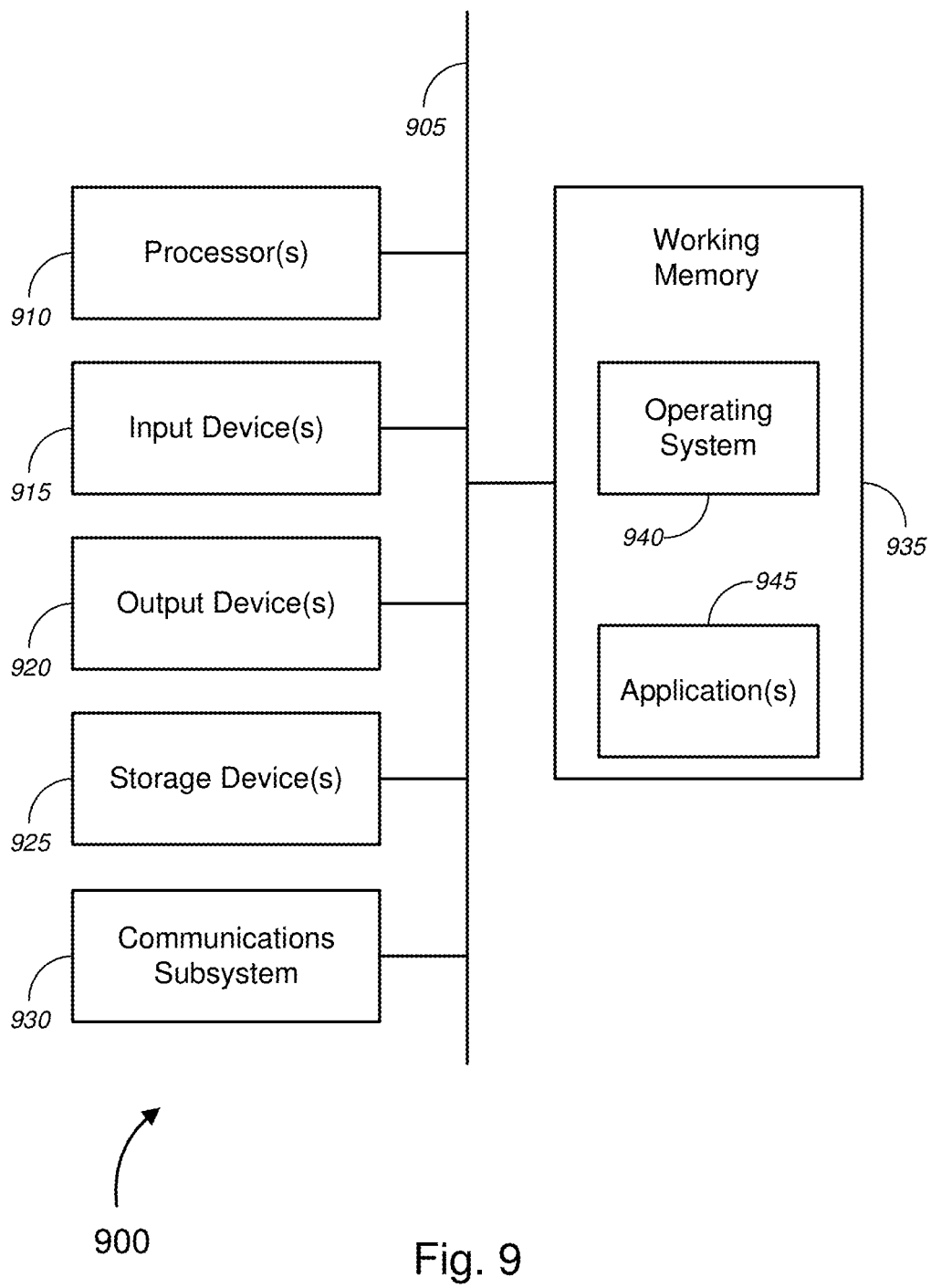
FIG. 9 is a block diagram illustrating an exemplary computer or system hardware architecture, in accordance with various embodiments.

With reference to FIG. 8B, method 800 might further comprise calculating, by the one or more second nodes among the plurality of nodes within the blockchain network, a value of all unspent tokens contained in all unpruned blocks preceding (optional block 835); adjusting a monetary policy of the blockchain network so that the blockchain network will reintroduce the unspent tokens as tokens allocated in future blocks (optional block 840); and pruning, by one or more second nodes among the plurality of nodes within the blockchain network, transaction slips in blocks in a blockchain preceding an arbitrary block identified according to consensus rules of the blockchain (optional block 845). In some embodiments, the unspent tokens might be reintroduced back into the blockchain network in a later block through use of golden tickets Exemplary System and Hardware Implementation FIG. 9 is a block diagram illustrating an exemplary computer or system hardware architecture, in accordance with various embodiments. FIG. 9 provides a schematic illustration of one embodiment of a computer system 900 of the service provider system hardware that can perform the methods provided by various other embodiments, as described herein, and/or can perform the functions of computer or hardware system (i.e., computing system 105, nodes 110, user devices 130a-130n and 135a-135n, etc.), as described above. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The computer or hardware system 900—which might represent an embodiment of the computer or hardware system (i.e., computing system 105, nodes 110, user devices 130a-130n and 135a-135n, etc.), described above with respect to FIGS. 1-8—is shown comprising hardware elements that can be electrically coupled via a bus 905 (or may otherwise be in communication, as appropriate). The hardware elements may include one or more processors 910, including, without limitation, one or more general-purpose processors and/or one or more special-purpose processors (such as microprocessors, digital signal processing chips, graphics acceleration processors, and/or the like); one or more input devices 915, which can include, without limitation, a mouse, a keyboard, and/or the like; and one or more output devices 920, which can include, without limitation, a display device, a printer, and/or the like.

The computer or hardware system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 900 might also include a communications subsystem 930, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer or hardware systems, and/or with any other devices described herein. In many embodiments, the computer or hardware system 900 will further comprise a working memory 935, which can include a RAM or ROM device, as described above.

The computer or hardware system 900 also may comprise software elements, shown as being currently located within the working memory 935, including an operating system 940, device drivers, executable libraries, and/or other code, such as one or more application programs 945, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a computer (or other device), in particular a general purpose computer, to perform one or more operations in accordance with the described methods.

A set of these instructions and/or code might be encoded and/or stored on a computer readable medium, in particular, a non-transitory computer readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure, and/or adapt a computer such as a general purpose computer with the instructions/code stored thereon. These instructions might take the form of executable code, which is executable by the computer or hardware system 900 and/or might take the form of source and/or installable code, which, upon compilation and/or installation on the computer or hardware system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 900) to perform methods in accordance with various embodiments of the invention. According to a set of embodiments, some or all of the procedures of such methods are performed by the computer or hardware system 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 900, various computer readable media might be involved in providing instructions/code to processor(s) 910 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 925. Volatile media includes, without limitation, dynamic memory, such as the working memory 935. In some alternative embodiments, a computer readable medium may take the form of transmission media, which includes, without limitation, coaxial cables, copper wire, and fiber optics, including the wires that comprise the bus 905, as well as the various components of the communication subsystem 930 (and/or the media by which the communications subsystem 930 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 900. These signals, which might be in the form of electromagnetic signals, acoustic signals, optical signals, and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

Figure 10:
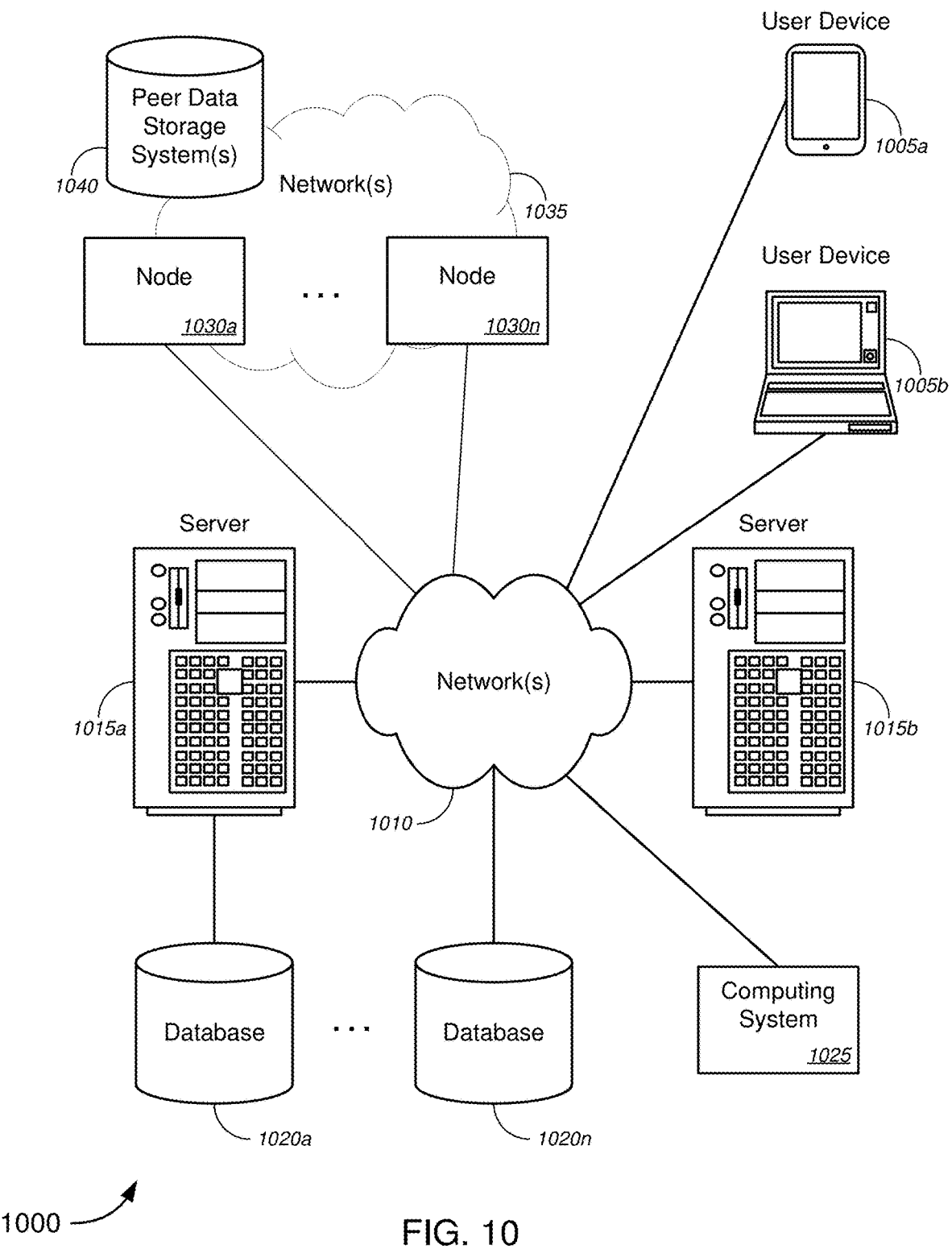
FIG. 10 is a block diagram illustrating a networked system of computers, computing systems, or system hardware architecture, which can be used in accordance with various embodiments.

As noted above, a set of embodiments comprises methods and systems for implementing blockchain transactions, and, more particularly, to methods, systems, and apparatuses for securing a blockchain with proof-of-transactions. FIG. 10 illustrates a schematic diagram of a system 1000 that can be used in accordance with one set of embodiments. The system 1000 can include one or more user computers, user devices, or customer devices 1005. A user computer, user device, or customer device 1005 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1005 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1005 can be any other electronic device, such as a thin-client computer, Internet-enabled mobile telephone, and/or personal digital assistant, capable of communicating via a network (e.g., the network(s) 1010 described below) and/or of displaying and navigating web pages or other types of electronic documents. Although the exemplary system 1000 is shown with two user computers, user devices, or customer devices 1005, any number of user computers, user devices, or customer devices can be supported.

Certain embodiments operate in a networked environment, which can include a network(s) 1010. The network(s) 1010 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1010 (similar to network(s) 120*a*-120*n*, 125, and 140*a*-140*n* of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1015. Each of the server computers 1015 may be configured with an operating system, including, without limitation, any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 might be a data server, a web server, a cloud computing device(s), or the like, as described above. The data server might include (or be in communication with) a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can be configured with one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1005 and/or another server 1015. In some embodiments, an application server can perform one or more of the processes for implementing blockchain transactions, and, more particularly, to methods, systems, and apparatuses for securing a blockchain with proof-of-transactions, as described in detail above. Data provided by an application server may be formatted as one or more web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases, a web server may be integrated with an application server.

In accordance with further embodiments, one or more servers 1015 can function as a file server and/or can include one or more of the files (e.g., application code, data files, etc.) necessary to implement various disclosed methods, incorporated by an application running on a user computer 1005 and/or another server 1015. Alternatively, as those skilled in the art will appreciate, a file server can include all necessary files, allowing such an application to be invoked remotely by a user computer, user device, or customer device 1005 and/or server 1015.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020a-1020n (collectively, "databases 1020"). The location of each of the databases 1020 is discretionary: merely by way of example, a database 1020a might reside on a storage medium local to (and/or resident in) a server 1015a (and/or a user computer, user device, or customer device 1005). Alternatively, a database 1020n can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle database, that is adapted to store, update, and retrieve data in response to SQL-formatted commands. The database might be controlled and/or maintained by a database server, as described above, for example.

According to some embodiments, system 1000 might further comprise a computing system 1025 (similar to computing system 105 of FIG. 1, or the like), one or more nodes 1030a-1030n (collectively, "nodes 1030" or the like; similar to nodes 110 of FIG. 1, or the like), network(s) 1035 (similar to network(s) 120a-120n or 125 of FIG. 1, or the like), one or more peer data storage systems 1040 (similar to peer data storage systems #1-#N 115$_1$-115$_N$ of FIG. 1, or the like), and/or the like.

In operation, the plurality of nodes 1030 might propagate an unconfirmed transaction across at least one of the networks 1035. The computing system 1025 or a first node 1030a among the plurality of nodes 1030 might embed, into the unconfirmed transaction, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network. The computing system 1025 or a second node 1030b (not shown) among the plurality of nodes 1030 might validate the chain of signatures embedded in the transactions included in a block of a blockchain to confirm that the block itself is valid in accordance with a set of consensus rules of the blockchain.

In some embodiments, the computing system 1025 or one or more third nodes 1030c (not shown) among the plurality of nodes 1030 might quantify a level of difficulty associated with producing a valid candidate block by reducing it to a burn fee, in accordance with a set of consensus rules of a blockchain. In some cases, the burn fee might be a cost denominated in a value of a token managed by the blockchain network. According to some embodiments, the computing system 1025 or one or more third nodes 1030c might quantify the value of one or more transactions being included in a candidate block by reducing it to a burn value, in accordance with the set of consensus rules of the blockchain. In some instances, the burn value might be a figure denominated in a value of a token managed by the blockchain network. In some embodiments, the computing system 1025 or one or more third nodes 1030c might determine whether a sum of individual burn values of the one or more transactions that are included in the candidate block is equal to or greater than the burn fee of the candidate block, in accordance with the set of consensus rules of the blockchain. Based on a determination that the sum of individual burn values of the one or more transactions that are included in the candidate block is equal to or greater than the burn fee of the candidate block, the computing system 1025 or one or more third nodes 1030c might determine that the candidate block is valid according to the set of consensus rules of the blockchain.

In some embodiments, at least a majority of the plurality of nodes 1030 in the blockchain network 1035 might determine whether aggregate burn values of the transactions included in a block are sufficient to pay for the burn fee required for production of a block. Based on a determination that the aggregate burn values of the transactions included in the block are sufficient to pay for the burn fee required for the production of the block, the at least a majority of the plurality of nodes 1030 might determine that the block is valid and might include the block in a blockchain. In some instances, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some cases, at least a portion of the burn value of the one or more transactions included in the candidate block might be removed from circulation and not transferred to a node that produced the candidate block.

According to some embodiments, the computing system 1025 or one or more fourth nodes 1030d (not shown) among the plurality of nodes 1030 within the blockchain network 1035 might prune transaction slips in blocks in a blockchain preceding an arbitrary block identified according to consensus rules of the blockchain, and might calculate a value of all unspent tokens contained in all unpruned blocks preceding and including the last block being pruned. The computing system 1025 or at least one node among the plurality of nodes 1030 might adjust a monetary policy of the blockchain network so that the blockchain network would reintroduce the unspent tokens as tokens allocated in future blocks. In some cases, the unspent tokens might be reintroduced back into the blockchain network in a later block through use of golden tickets.

In some embodiments, the computing system 1025 or a fifth node 1030e (not shown) among the plurality of nodes 1030 in the blockchain network might generate a golden ticket that contains a computational puzzle. The computing system 1025 or a sixth node 1030f (not shown) among the plurality of nodes 1030 in the blockchain network might generate a solution to the computational puzzle in the golden ticket, where the solution to the computational puzzle might be used to select one or more network nodes among the plurality of nodes 1030 in the blockchain network, in a manner that cannot be anticipated by the computing system 1025 or the fifth node 1030*e* generating the golden ticket. In some instances, at least two of the first node 1030*a*, the second node 1030*b*, the third node 1030*c*, the fourth node 1030*d*, the fifth node 1030*e*, the sixth node 1030*f*, and/or the computing system 1025 might be the same node. Alternatively, the first node 1030*a*, the second node 1030*b*, the third node 1030*c*, the fourth node 1030*d*, the fifth node 1030*e*, the sixth node 1030*f*, and/or the computing system 1025 might be different nodes. In some embodiments, the golden ticket might be at least one of included in a block published for inclusion in a blockchain or automatically associated with the block, and/or the like. In some cases, the golden ticket might include, without limitation, a random number that is created using data associated with the block. In some instances, the random number might comprise a cryptographic hash of data content contained within the block. In some cases, the solution to the golden ticket might be included in a block immediately following the block in which the golden ticket is included was published. In some instances, any valid blockchain might contain one or more golden tickets, each of which may be solved only once.

These and other functions of the system 1000 (and its components) are described in greater detail above with respect to FIGS. 1-8.

In the present disclosure, "nodes" can be considered "computer nodes," "lucky miners" can be considered "solution-providing miners," "lucky nodes" can be considered "solution-selected nodes," a "vote of the block" can be considered a "variable embedded in the block," a "vote of the golden ticket" can be considered a "variable embedded in the golden ticket," a "vote of the transaction" can be considered a "variable embedded in the transaction," and a "golden ticket" can be considered a data structure containing a computational puzzle to be solved by solution-providing miners, the solution being used to select network nodes in the blockchain as described above.

The accompanying method claims can be considered computer-implemented methods.

Although the accompanying claims are presented with single dependencies, this is to satisfy the requirements of certain jurisdictions. Unless it is clear that the features are presented as incompatible alternatives, the features of any dependent claim can be combined with those of any one or more dependent claims before it, together with the features of the independent claim upon which these dependent claims depend. In other words, the dependent claims can be combined as if they contain multiple dependencies, as are allowed in some jurisdictions, and multiple dependencies may be inserted in the dependent claims.

One aspect provides a computer readable medium comprising computer executable instructions which, when executed by a computer, cause the computer to perform the method of any of the accompanying method claims or a relevant part of the method.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    embedding, by at least one first node among a plurality of nodes in a peer-to-peer blockchain network and into an unconfirmed transaction, one or more first cryptographic signatures and one or more first network addresses;
    propagating, using one or more second nodes among the plurality of nodes, the unconfirmed transaction across the peer-to-peer blockchain network for eventual inclusion in a block; and
    embedding, by a third node among the plurality of nodes and into the unconfirmed transaction, a second cryptographic signature and a second network address that combines with the one or more first cryptographic signatures and the one or more first network addresses to create a chain of signatures that constitutes an independently-verifiable and unforgeable record of a routing path that the unconfirmed transaction takes as it propagates across the peer-to-peer blockchain network.

2. The method of claim 1, wherein each node among the plurality of nodes in the peer-to-peer blockchain network is associated with a unique public/private key pair and a network address, wherein the unique public/private key pair comprises a public key and a private key, wherein the network address of a node among the plurality of nodes contains information derived from the unique public/private key pair of the node, and a cryptographic signature of the node is generated by using the private key of the unique public/private key pair of the node to sign a network address of a subsequent node among the plurality of nodes to which the transaction is routed by the node.

3. The method of claim 1, wherein the network address and the other network addresses constitute a plurality of network addresses, wherein a network address associated with an originating node that originates the transaction is not included in the plurality of network addresses, based on a determination that information required to validate a cryptographic signature associated with the originating node is already included in the transaction.

4. The method of claim 1, wherein the first node and the second node are the same node.

5. The method of claim 1, further comprising:
quantifying, by one or more third nodes among the plurality of nodes in the blockchain network and in accordance with a set of consensus rules of a blockchain, a level of difficulty associated with producing a valid candidate block by reducing it to a burn fee, wherein the burn fee is a cost denominated in a value of a token managed by the blockchain network;
quantifying, by the one or more third nodes and in accordance with the set of consensus rules of the blockchain, the value of one or more transactions being included in a candidate block by reducing it to a burn value, wherein the burn value is a figure denominated in a value of a token managed by the blockchain network;
determining, with the one or more third nodes and in accordance with the set of consensus rules of the blockchain, whether a sum of individual burn values of the one or more transactions that are included in the candidate block is equal to or greater than the burn fee of the candidate block; and
based on a determination that the sum of individual burn values of the one or more transactions that are included in the candidate block is equal to or greater than the burn fee of the candidate block, determining, with the one or more third nodes, that the candidate block is valid according to the set of consensus rules of the blockchain.

6. The method of claim 5, wherein the burn fee is algorithmically set by at least one computing system in the blockchain network.

7. The method of claim 5, wherein a burn fee needed for production of a block decreases over time in proportion to time elapsed since generation of a preceding block in the blockchain.

8. The method of claim 5, wherein a burn value of a transaction comprises a transaction fee paid by an originator of the transaction for inclusion of its transaction in the blockchain.

9. The method of claim 5, wherein a burn value of a transaction is adjusted depending on whether the transaction contains a valid chain of embedded cryptographic signatures establishing a route that the transaction has taken in its course of propagating across the blockchain network.

10. The method of claim 5, wherein a burn value of a transaction is adjusted downward depending on the number of hops that the transaction has made across the blockchain network, as measured by an embedded chain of cryptographic signatures contained within the transaction that document its course of transmission across the blockchain network.

11. The method of claim 10, wherein the burn value of the transaction is halved with each additional hop beyond a first hop that the transaction has made through the blockchain network from its point of origin to its point of inclusion in a block.

12. The method of claim 5, further comprising:
determining, with at least a majority of the plurality of nodes in the blockchain network, whether aggregate burn values of the transactions included in a block are sufficient to pay for the burn fee required for production of a block; and
based on a determination that the aggregate burn values of the transactions included in the block are sufficient to pay for the burn fee required for the production of the block, determining, with the at least a majority of the plurality of nodes in the blockchain network, that the block is valid and including, with the at least a majority of the plurality of nodes in the blockchain network, the block in a blockchain.

13. The method of claim 5, wherein at least a portion of a difference in value between a burn value of a transaction included in a block and a burn fee needed to produce a block, as measured in the value of the token managed by the blockchain network, is granted to a node among the plurality of nodes that produces the block as a form of payment for producing the block.

14. The method of claim 5, wherein at least a portion of the burn value of the one or more transactions included in the candidate block is removed from circulation and not transferred to a node that produced the candidate block.

15. The method of claim 1, further comprising:
pruning, by one or more fourth nodes among the plurality of nodes within the blockchain network, transaction slips in blocks in a blockchain preceding an arbitrary block identified according to consensus rules of the blockchain;
calculating, by the one or more fourth nodes among the plurality of nodes within the blockchain network, a value of all unspent tokens contained in all unpruned blocks preceding and including the last block being pruned; and
adjusting a monetary policy of the blockchain network so that the blockchain network will reintroduce the unspent tokens as tokens allocated in future blocks.

16. The method of claim 15, wherein the unspent tokens are reintroduced back into the blockchain network in a later block through use of golden tickets.

17. The method of claim 1, further comprising:
validating, with a fourth node among the plurality of nodes, the chain of signatures embedded in the transactions included in a block of a blockchain to confirm that the block itself is valid in accordance with a set of consensus rules of the blockchain.

18. A system, comprising:
at least one first node among a plurality of nodes in a peer-to-peer blockchain network, the at least one first node each comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes each of the at least one first node to:
embed, into an unconfirmed transaction, one or more first cryptographic signatures and one or more first network addresses;
one or more second nodes among the plurality of nodes, the one or more second nodes each comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes each of the one or more second nodes to:
propagate the unconfirmed transaction across the peer-to-peer blockchain network for eventual inclusion in a block; and
a third node among the plurality of nodes, the third node comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the third node to:
embed, into the unconfirmed transaction, a second cryptographic signature and a second network address that combines with the one or more first cryptographic signatures and the one or more first network addresses to create a chain of signatures that constitutes an independently-verifiable and unforgeable record of a routing path that the unconfirmed transaction takes as it propagates across the peer-to-peer blockchain network.

19. The system of claim 18, wherein the first node and the second node are the same node.

20. The system of claim 18, further comprising:
a fourth node among the plurality of nodes, the fourth node comprising:
at least one fourth processor; and
a fourth non-transitory computer readable medium communicatively coupled to the at least one fourth processor, the fourth non-transitory computer readable medium having stored thereon computer software comprising a fourth set of instructions that, when executed by the at least one fourth processor, causes the fourth node to:
validate the chain of signatures embedded in the transactions included in a block of a blockchain to confirm that the block itself is valid in accordance with a set of consensus rules of the blockchain.

* * * * *